United States Patent
Li et al.

(10) Patent No.: US 10,270,682 B2
(45) Date of Patent: Apr. 23, 2019

(54) SERVICE LAYER ANYCAST AND SOMECAST

(71) Applicant: CONVIDA WIRELESS, LLC, Wilmington, DE (US)

(72) Inventors: Hongkun Li, Malvern, PA (US); Chonggang Wang, Princeton, NJ (US); Qing Li, Princeton Junction, NJ (US); Rocco Di Girolamo, Laval (CA); Lijun Dong, San Diego, CA (US); Catalina Mladin, Hatboro, PA (US)

(73) Assignee: Convida Wireless, LLC, Wilmington, DE (US)

( * ) Notice: Subject to any disclaimer, the term of this patent is extended or adjusted under 35 U.S.C. 154(b) by 140 days.

(21) Appl. No.: 15/205,715

(22) Filed: Jul. 8, 2016

(65) Prior Publication Data
US 2017/0012857 A1 Jan. 12, 2017

Related U.S. Application Data

(60) Provisional application No. 62/190,007, filed on Jul. 8, 2015.

(51) Int. Cl.
| | |
|---|---|
| *G06F 15/173* | (2006.01) |
| *H04L 12/721* | (2013.01) |
| *H04L 29/06* | (2006.01) |
| *H04Q 11/04* | (2006.01) |
| *G06Q 30/02* | (2012.01) |
| *H04L 29/08* | (2006.01) |

(Continued)

(52) U.S. Cl.
CPC ......... *H04L 45/12* (2013.01); *G06Q 30/0269* (2013.01); *H04L 12/1886* (2013.01); *H04L 65/40* (2013.01); *H04L 65/60* (2013.01); *H04L 67/02* (2013.01); *H04L 67/1044* (2013.01); *H04Q 11/0478* (2013.01); *H04W 84/18* (2013.01)

(58) Field of Classification Search
CPC ....... H04L 12/185; H04L 45/00; H04L 45/02; H04L 45/16; H04L 12/1868; H04L 41/06
See application file for complete search history.

(56) References Cited

U.S. PATENT DOCUMENTS

| | | | | |
|---|---|---|---|---|
| 6,831,918 | B1 * | 12/2004 | Kavak | H04Q 11/0478 370/395.52 |
| 2002/0085506 | A1 * | 7/2002 | Hundscheidt | H04L 12/185 370/254 |

(Continued)

FOREIGN PATENT DOCUMENTS

WO  WO 2013-022307 A2  2/2013

OTHER PUBLICATIONS

European Telecommunications Standards Institute (ETSI) TS 102 690, V1.1.1, "Machine-to-Machine Communications (M2M); Functional Architecture", Oct. 2011, 146 pages.

(Continued)

*Primary Examiner* — Kyung H Shin
(74) *Attorney, Agent, or Firm* — BakerHostetler

(57) ABSTRACT

Somecast/anycast service may function at the service layer and include service nodes/groups selection and post-selection processing. Somecast/anycast information may be used for identifying different scenarios of anycast/somecast, facilitating service nodes selection, and handling retransmission.

17 Claims, 19 Drawing Sheets

(51) Int. Cl.
    *H04L 12/18*      (2006.01)
    *H04W 84/18*      (2009.01)

(56) References Cited

U.S. PATENT DOCUMENTS

2010/0023828 A1\*  1/2010  Weinman ............ H04L 12/1868
                                              714/748
2014/0307618 A1   10/2014  Kim et al.
2015/0269629 A1\*  9/2015  Lo ...................... G06Q 30/0269
                                              705/14.66

OTHER PUBLICATIONS

OneM2M Technical Specification TS-0001-V1.6.1, "Functional Architecture", Jan. 30, 2015, 321 pages.
Open Mobile Alliance, "Lightweight Machine to Machine Technical Specification", Candidate Version 1.0, Nov. 26, 2014, 112 pages.
W3C Web Services Description Language (WSDL) 1.1, Mar. 15, 2001, 30 pages.
Cheshire, S. and Krochmal, M., "DNS-Based Service Discovery", Internet Engineering Task Force (IETF), RFC 6763, Feb. 2013, 44 pages.
Abley et al, "Operation of Anycast Services" Network Working Group, RFC 4786, Dec. 2006, 22 pages.
Helder, D. and Jamin, S., "IPv4 Option for Somecast", Internet Draft, Jul. 2000, 12 pages.
Hsiang et al, "Web2OHS: A Web2.0-Based Omnibearing Homecare System", IEEE Transactions on Information Technology in Biomedicine, IEEE Service Center, Los Alamitos, CA, vol. 13, No. 2, Mar. 1, 2010, pp. 224-233.
International Application No. PCT/US2016/041484: International Search report and Written Opinion dated Jul. 8, 2015, 11 pages.

\* cited by examiner

SERVICE LAYER ANYCAST AND SOMECAST

CROSS-REFERENCE TO RELATED APPLICATIONS

This application claims the benefit of U.S. Provisional Patent Application No. 62/190,007, filed on Jul. 8, 2015, entitled "Service Layer Anycast and Somecast," the contents of which are hereby incorporated by reference herein.

BACKGROUND

M2M Service Layer

From a protocol stack perspective, service layers are typically layered on top of application protocol layer and provide value added services to client applications. Hence service layers are often categorized as 'middleware' services. For example, FIG. 1 shows an exemplary service layer 101 in between an IP networking stack 102 and applications 103.

An example deployment scenario of a service layer instances within a network is shown in FIG. 2. In FIG. 2, the service layer instances 105 are shown deployed on various network nodes (gateways and servers) and providing value-added services to network applications found in network application domain 106, device applications found in device application domain 107, as well as to the network nodes found in network services domain 108, for example. Service layer instance 105 is a realization of a service layer.

An M2M/IoT service layer is an example of one type of service layer specifically targeted towards providing value-added services for M2M/IoT type devices and applications. Industry standards bodies (e.g. oneM2M-oneM2M Functional Architecture, oneM2M-TS-0001 oneM2M Functional Architecture-V-2.1.0) has been developing M2M/IoT service layers to address the challenges associated with integration of M2M/IoT types of devices and applications into deployments such as the Internet/Web, cellular, enterprise, and home network. An M2M service layer can provide applications and devices access to a collection of M2M centric capabilities supported by the service layer. A few examples include security, charging, data management, device management, discovery, provisioning, and connectivity management. These capabilities are made available to applications via APIs which make use of message formats, resource structures and resource representations defined by the M2M service layer.

oneM2M develops technical specifications that address the need for a common M2M Service Layer that can be readily embedded within various hardware and software, and relied upon to connect a wide variety of devices in the field with M2M application servers worldwide.

The oneM2M common services layer supports a set of Common Service Functions (CSFs) (e.g., service capabilities), as shown in FIG. 3. An instantiation of a set of one or more particular types of CSFs is referred to as a common services entity (CSE) (e.g., CSE 111), which can be hosted on different types of network nodes (e.g., infrastructure node, middle node, application-specific node).

oneM2M is developing the service layer in two architectural approaches, called resource oriented architecture (RoA), e.g., FIG. 4, and service oriented architecture (SoA), e.g., FIG. 5. According to the oneM2M RoA RESTful architecture, CSFs are represented as a set of "resources." A resource is a uniquely addressable element in the architecture having a representation that can be manipulated via RESTful methods such as Create, Retrieve, Update, and Delete (CRUD). These resources are made addressable using universal resource identifiers (URIs). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information of the resource.

The SoA architecture is being developed to consider legacy deployment that is not RESTful based. It re-uses largely the same service layer architecture as shown in FIG. 5. The service layer contains various M2M services, and multiple services can be grouped into service components. In addition to existing reference points, it introduced the inter-service reference point Msc. Communication between M2M service components which pass over the Msc reference point utilizes a web services approach, e.g., web services message exchange patterns (MEP).

Group Management in oneM2M

There is a group management (GMG) CSF in oneM2M which is responsible for handling group related operations. GMG may handle the following operations:

Request to create, retrieve, update, and delete a group and the associated group members.

Create one or more groups in CSEs in the nodes in oneM2M system for a particular purpose (e.g., facilitation of access control, device management, fan-out common operations to a group of devices, etc.).

Manage group membership and handle requests to add or remove members to and from a group's member list.

Leverage the capabilities of other CSFs in order to fulfill the functionalities supported by the GMG CSF service functions. Examples include: Security CSF for authentication and authorization.

Forward requests to all members in the group. In case the group contains another group as a member, the forwarding process is done recursively. GMG CSF generates an aggregated response by aggregating the corresponding responses from the Group members.

Support subscriptions to individual groups.

Leverage the existing capabilities of the Underlying Network including broadcasting/multicasting.

FIG. 6 illustrates the <group> resource defined by oneM2M for group management. The virtual resource <fanOutPoint> is defined to deliver the specific request to each of the group members. FIG. 7 is an exemplary method flow for a <group> resource. FIG. 8 illustrates an exemplary method flow for a <fanOutPoint> resource.

SUMMARY

Somecast/anycast service may function at the service layer and include service nodes/groups selection and post-selection processing. Somecast/anycast information may be used for identifying different scenarios of anycast/somecast, facilitating service nodes selection, and handling retransmission.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 19 illustrates exemplary somecast/anycast method flows for oneM2M group management or the like;

DETAILED DESCRIPTION OF ILLUSTRATIVE EMBODIMENTS

Disclosed herein are concepts for service layer anycast and somecast. Somecast/anycast service (SAS) provides for service nodes/groups selection and post-selection processing, among other things. SAS as disclosed herein may help enable and support anycast and/or somecast communications with or without group management at service layer without using the anycast and/or somecast provided by underlying transport network or an underlying routing protocol.

Figure 1:
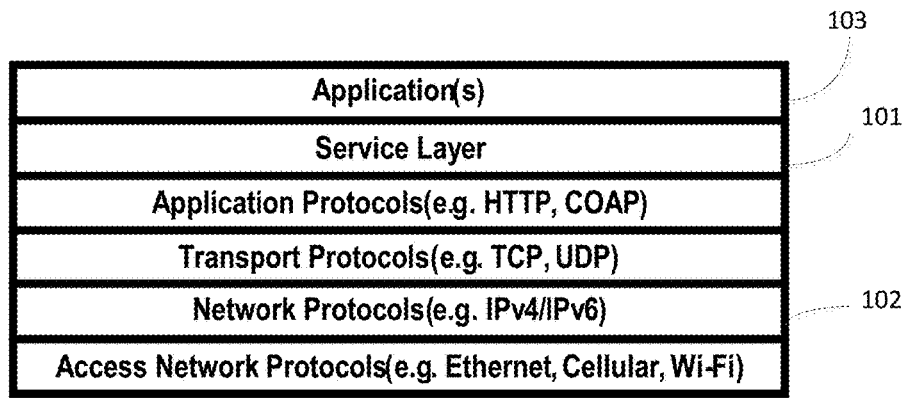
FIG. 1 illustrates an exemplary service layer in between an IP networking stack and applications.
Figure 2:
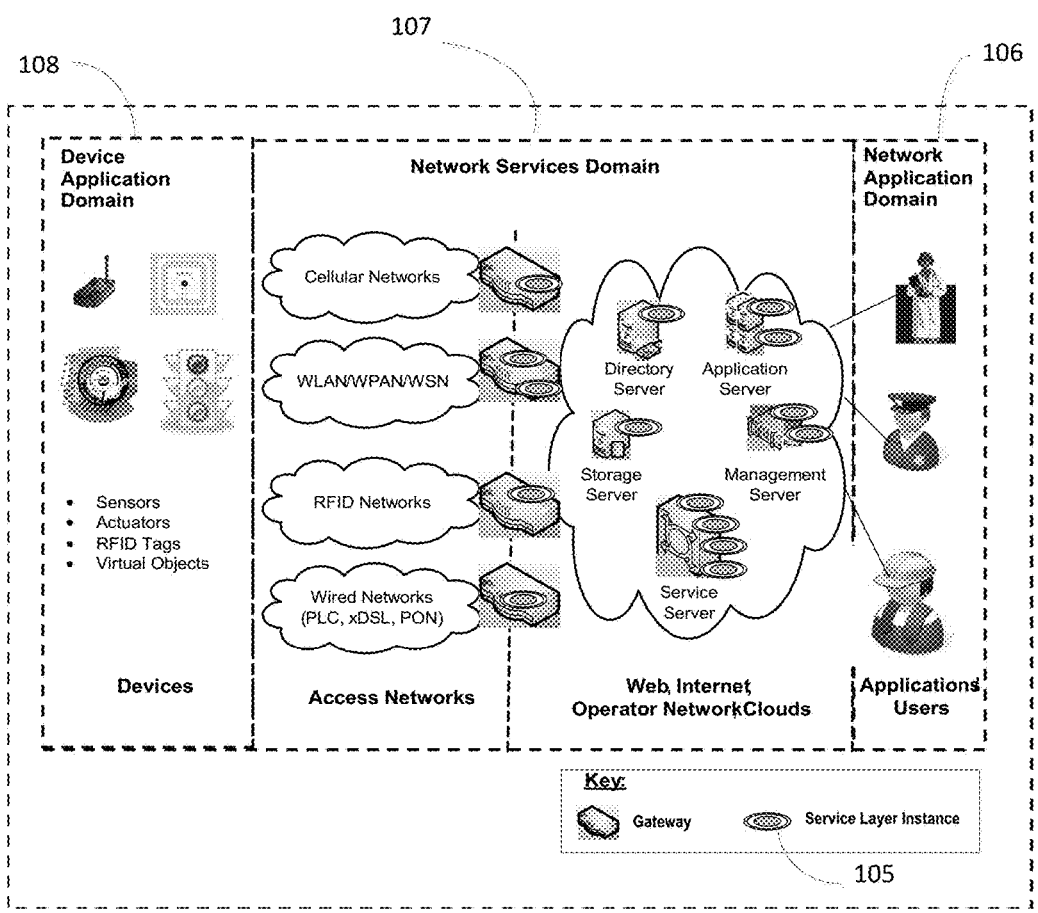
FIG. 2 illustrates an exemplary deployment scenario of a service layer instances within a network.
Figure 3:
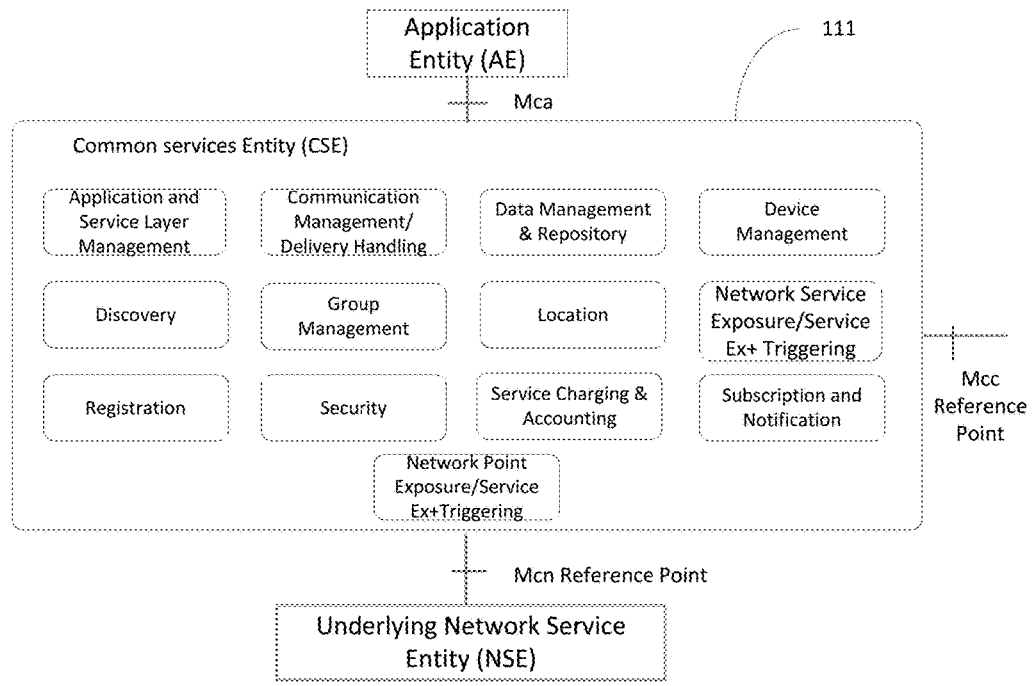
FIG. 3 illustrates an exemplary oneM2M common services layer with common service functions.
Figure 4:
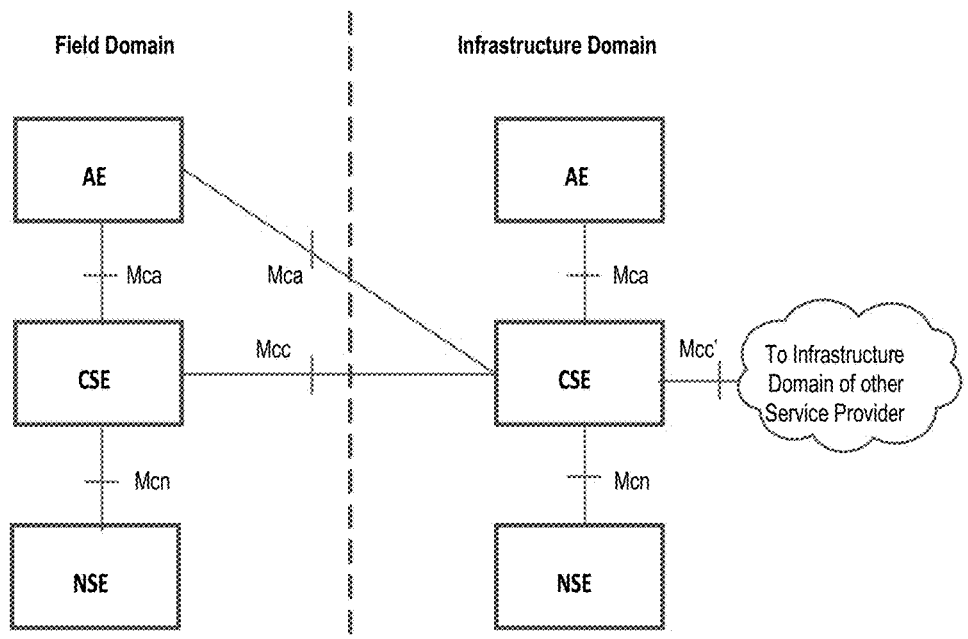
FIG. 4 illustrates an exemplary oneM2M service layer functional architecture.
Figure 5:
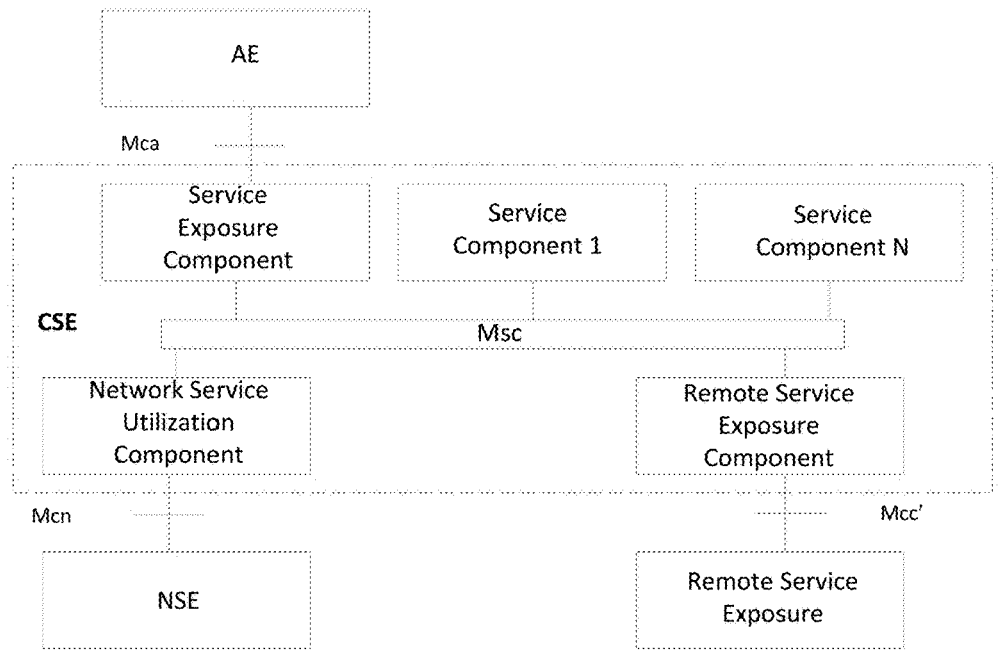
FIG. 5 illustrates an exemplary oneM2M Services Component Architecture.
Figure 6:
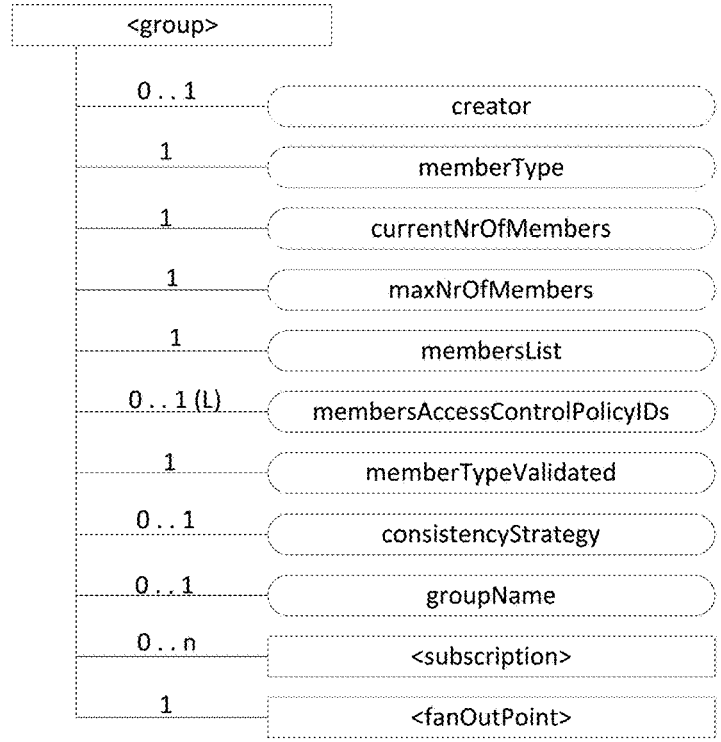
FIG. 6 illustrates an exemplary <group> resource defined by oneM2M for group management.
Figure 7:
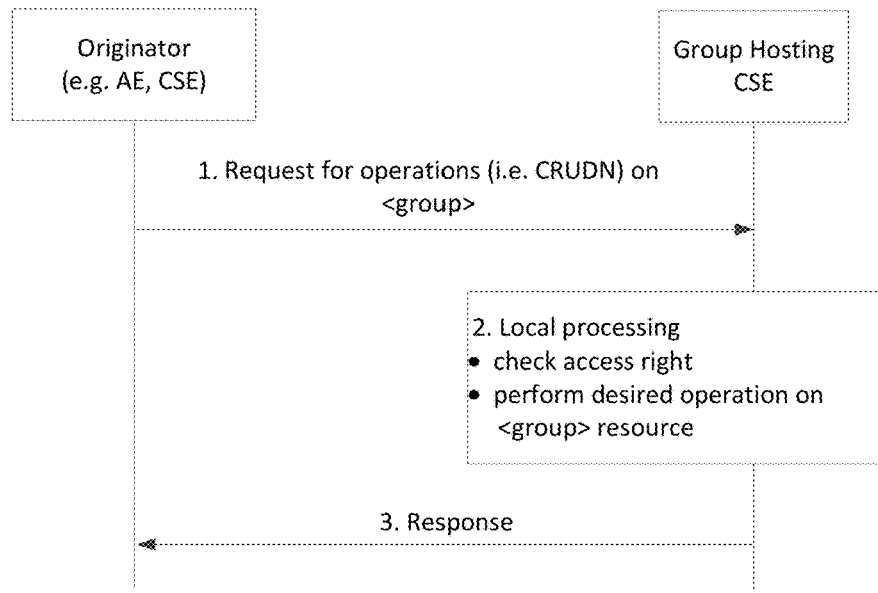
FIG. 7 illustrates exemplary procedures (CRUDN) on <group> resource.
Figure 8:
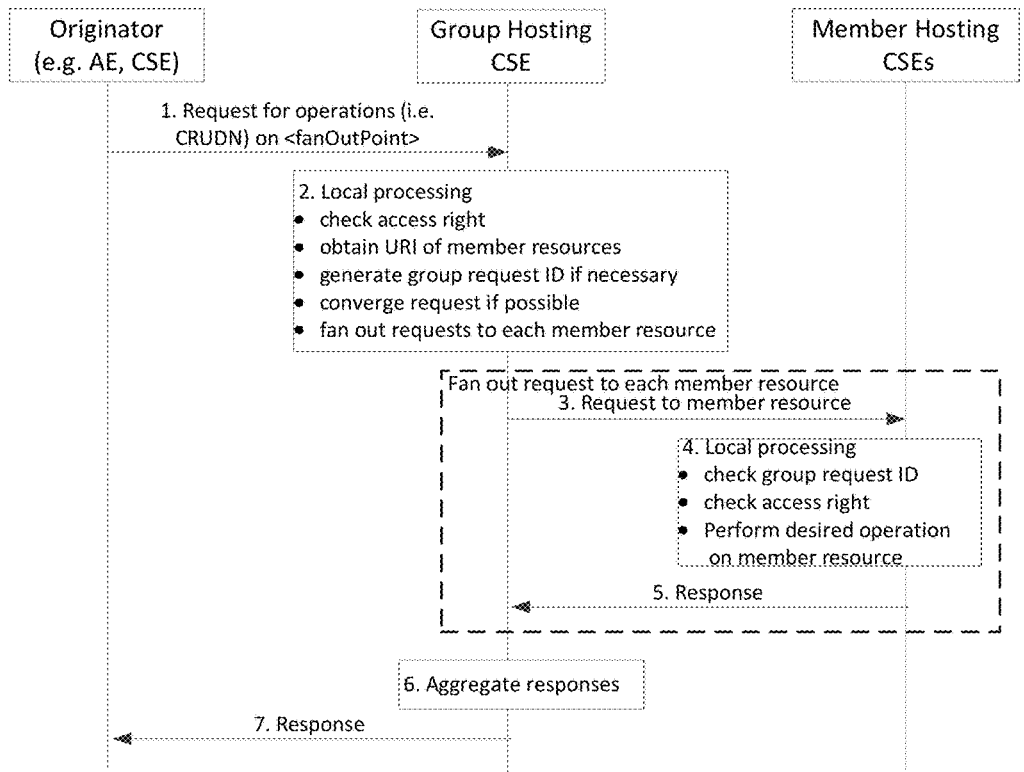
FIG. 8 illustrates exemplary procedures (CRUDN) on <fanOutPoint> resource.
Figure 9:
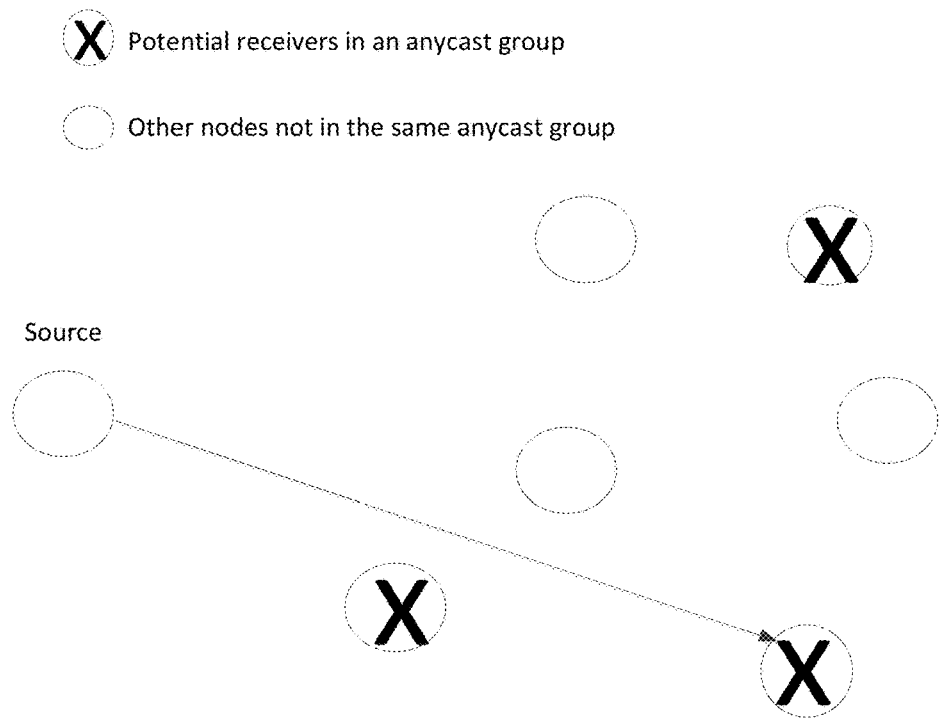
FIG. 9 illustrates an exemplary anycast at internet protocol layer.

FIG. 9 illustrates the anycast communication at the IP layer. Anycast at IP layer is a network addressing and routing methodology in which datagrams from a single sender are routed to the topologically nearest node in a group of potential receivers, though it may be sent to several nodes, all identified by the same destination address. On the Internet, anycast is usually implemented by using Border Gateway Protocol (BGP) to announce reachability of multiple nodes at a single service address. Packets addressed to destination addresses in this range may be routed to the "nearest" point on the net announcing the given destination IP address. With the growth of the Internet, network services increasingly have high-availability requirements for anycast. IETF RFC 4786, "Operation of anycast services": http://tools.ietforg/html/rfc4786 operates as the current practice to deploy or operate a distributed service using anycast for network operators. Anycast may provide some level of load balancing by distributing a service within a network.

Figure 10:
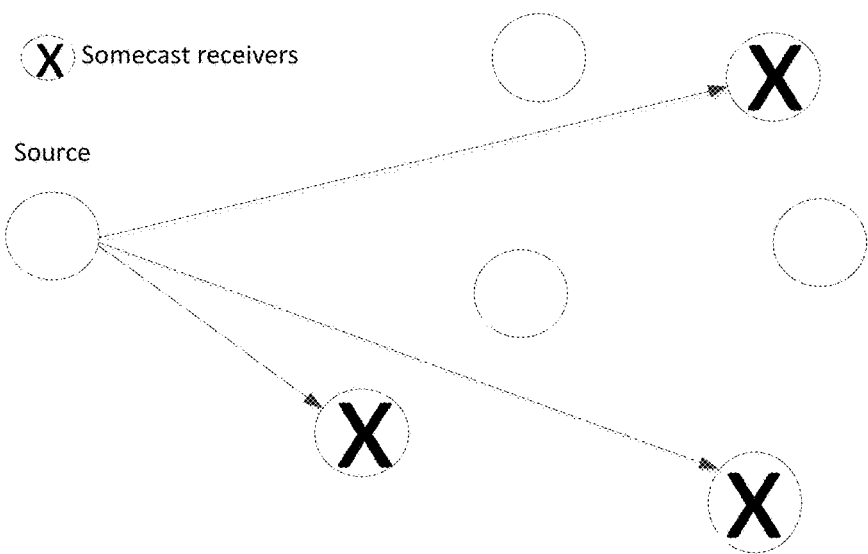
FIG. 10 illustrates an exemplary somecast at internet protocol layer.

FIG. 10 illustrates the somecast at IP layer. Somecast (e.g., IETF Draft, IPv4 option for somecast, 2000) is a multi-point delivery technology that allows a packet to be sent to a set of destinations. With somecast delivery a network delivers one copy of a packet to each destination listed in the packet. Somecast may be used in small multi-user sessions, such as multimedia conferences and multi-player games, or used with end host multicast for larger sessions.

IP somecast is a means of multicast in terms of addressing scheme. IP multicast is a method of sending Internet Protocol (IP) datagrams to a group of interested receivers in a single transmission. IP multicast is a technique for one-to-many and many-to-many real-time communication over an IP infrastructure in a network. Key concepts in IP multicast include an IP multicast group address, a multicast distribution tree and receiver driven tree creation. An IP multicast group address is used by sources and the receivers to send and receive multicast messages.

Figure 11:
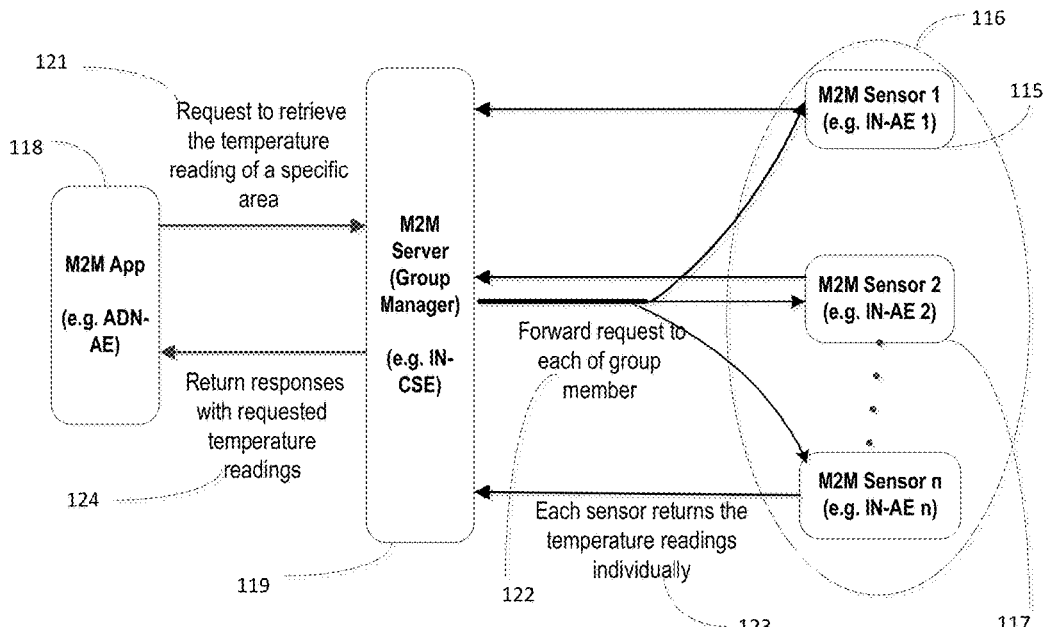
FIG. 11 illustrates an exemplary group operation.

FIG. 11 illustrates an exemplary use case that may benefit from a group operation that uses service layer anycast. A service provider may distribute many temperature sensors, such as temperature sensor 115 and temperature sensor 117, to provide the real-time temperature readings as a service. For easy management and configuration, e.g., software update and security configuration, a group may be formed, and the sensors of FIG. 11 (e.g., temperature sensor 115, temperature sensor 117, among others) may be managed as a group by the service provider. In an exemplary conventional scenario, at step 121, service layer client 118 may send a request to retrieve a temperature reading for area 116 where temperature sensor 115, temperature sensor 117, among other temperature sensors, are deployed. Based on conventional service layer group management mechanisms, at step 122, group hosting node 119 forwards the request of step 121 to each temperature sensor 115, temperature sensor 117, among others (i.e., each group member individually). At step 123, each temperature sensor, responsive to the request of step 122, returns the response with temperature readings, respectively. At step 124, each response is returned to service layer client 118.

With continued reference to the discussion of FIG. 11, conventional group operations without service layer anycast may lead to unnecessary data flows (e.g., communication overhead and operation overhead at each sensor), as well as redundant temperature readings. In addition, there may be excessive messages (request/response). Most likely temperature data reported from one sensor is enough, and service layer client 118 may deem any temperature sensor (e.g., temperature sensor 115 or temperature sensor 117) in area 116 acceptable. In this scenario, temperature sensors may be located close to each other and may provide the same or very similar temperature readings, assuming all the sensors have similar sensing capability.

Service layer anycast, as discussed herein, is a service layer communication for performing service layer operations (e.g., CRUD). In summary, an originator (e.g., service layer client 118) sends a request message to registrar node (e.g., group hosting node 119) with or without targeting a group of service layer nodes (e.g., temperature sensors in area 116). The operation is performed by one of a plurality of qualified service nodes, and the originator does not care about or may not be aware of which service node performs the operation. Example types of service layer anycast include group based anycast and non-group based anycast. In group based anycast an originator may explicitly specify group information (e.g., group ID, URI of <group> resource), so that a registrar node may select one service node from members of the specified group(s) (e.g., area 116) for performing the desired operations. In non-group based anycast, an originator may not explicitly specify any group information, and instead it may provide some conditions in the message (e.g., location information, access right requirement). The registrar node determines the scope of service node and may select a service node based on the conditions.

Figure 12:
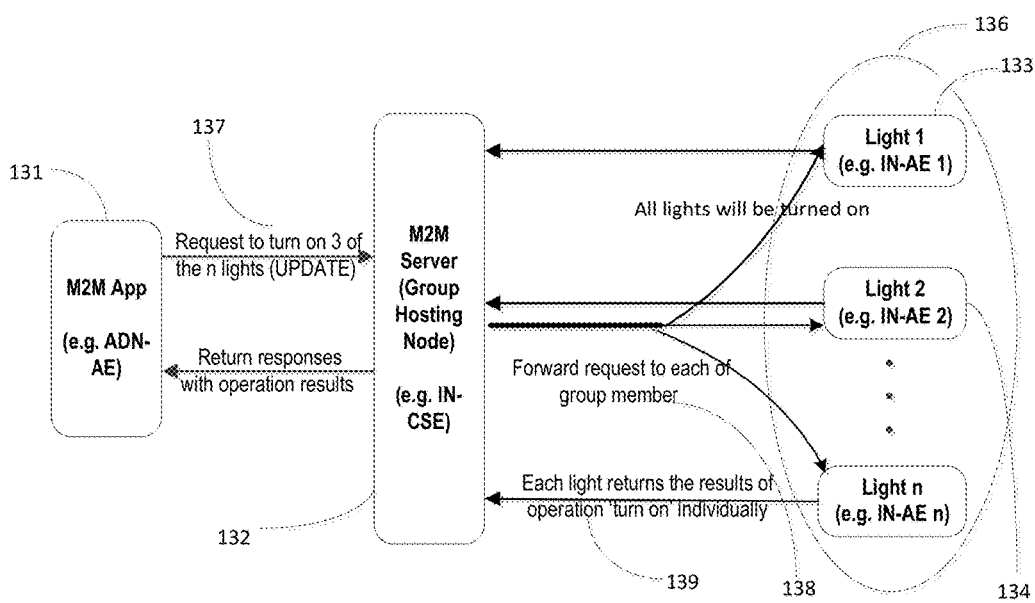
FIG. 12 illustrates an exemplary group operation.

FIG. 12 illustrates an example of a use case where conventional group operations of lights may benefit by using service layer somecast. Here, a mobile phone includes application 131 that remotely controls n lights in living room 136 (e.g., light 133, and light 134, among others). The n lights of living room 136 may be grouped together for management at service layer. The group of lights in living room 136 may be controlled via application 131 to perform operations, such as turn on/off the light in living room 136 and adjust the brightness of lights in living room 136. In a scenario, it may not be necessary to turn on all the lights in living room 136, while it is good enough to turn on a subset of the lights in living room 136. It may not matter which lights in living room 136 are turned on as long as they provided the desired level of brightness, which may be detected by a photometer or the like.

With continued reference to FIG. 12, the application sends the request to group hosting node 132 (e.g., IN-CSE) to turn on 3 lights in the group (at step 137). However, based on existing service layer group management mechanisms, group hosting node 132 forwards the request message of step 137 to each light in the group (at step 138). Each light in living room 136 may be turned on and return the response with operation results to group hosting node individually (at step 139). Conventional group operations do not turn on 3 lights while keeping others off, which may lead to unnecessary consumption of energy, and redundant message exchanges, among other things. SAS as disclosed herein may help enable and support anycast and/or somecast communications with or without group management at service layer without using the anycast and/or somecast provided by underlying transport network or an underlying routing protocol.

Service layer somecast, as discussed herein, is a service layer communication for performing service layer operations (e.g., CRUD). In summary, an originator (e.g., application 131) sends out a request message to the registrar node (e.g., group hosting node 132), which selects and forwards the request to a plurality of qualified service nodes (e.g., light 133 or light 134) for performing the desired operation. The originator generally does not care which of the plurality of service nodes perform the operations, so long as the end function is performed (e.g., an amount of light in living room 136). Example types of service layer somecast include group based somecast and non-group based somecast. In group based somecast an originator may explicitly specify group information of one or more groups (e.g., living room 136). A registrar node may select the determined number of service nodes from group(s), and forwards the request to the selected service nodes, which may stay in a group or in different groups. A special case is that originator provides the addresses (e.g., URIs, IP addresses) of a list of service nodes, so registrar node only needs to forward the request without selecting service nodes. In non-group based somecast, an originator may not explicitly specify any group information, but instead the originator provides some conditions to a registrar node (e.g., the amount of light in living room 136). The registrar node determines the scope of service nodes based on the condition, and forwards the request.

The scope of service node specifies the range of a set of service nodes that are considered as a candidate service node when registrar node selects for anycast and somecast request. For group based scenario, the originator may specify the scope by indicating the group ID, therefore registrar node does not need to determine the scope; while for non-group based scenario, registrar node needs to determine the scope since the group ID information is not given. Discussed herein are methods, systems, and devices for supporting group based and non-group based anycast/somecast at the service layer.

Figure 23A:
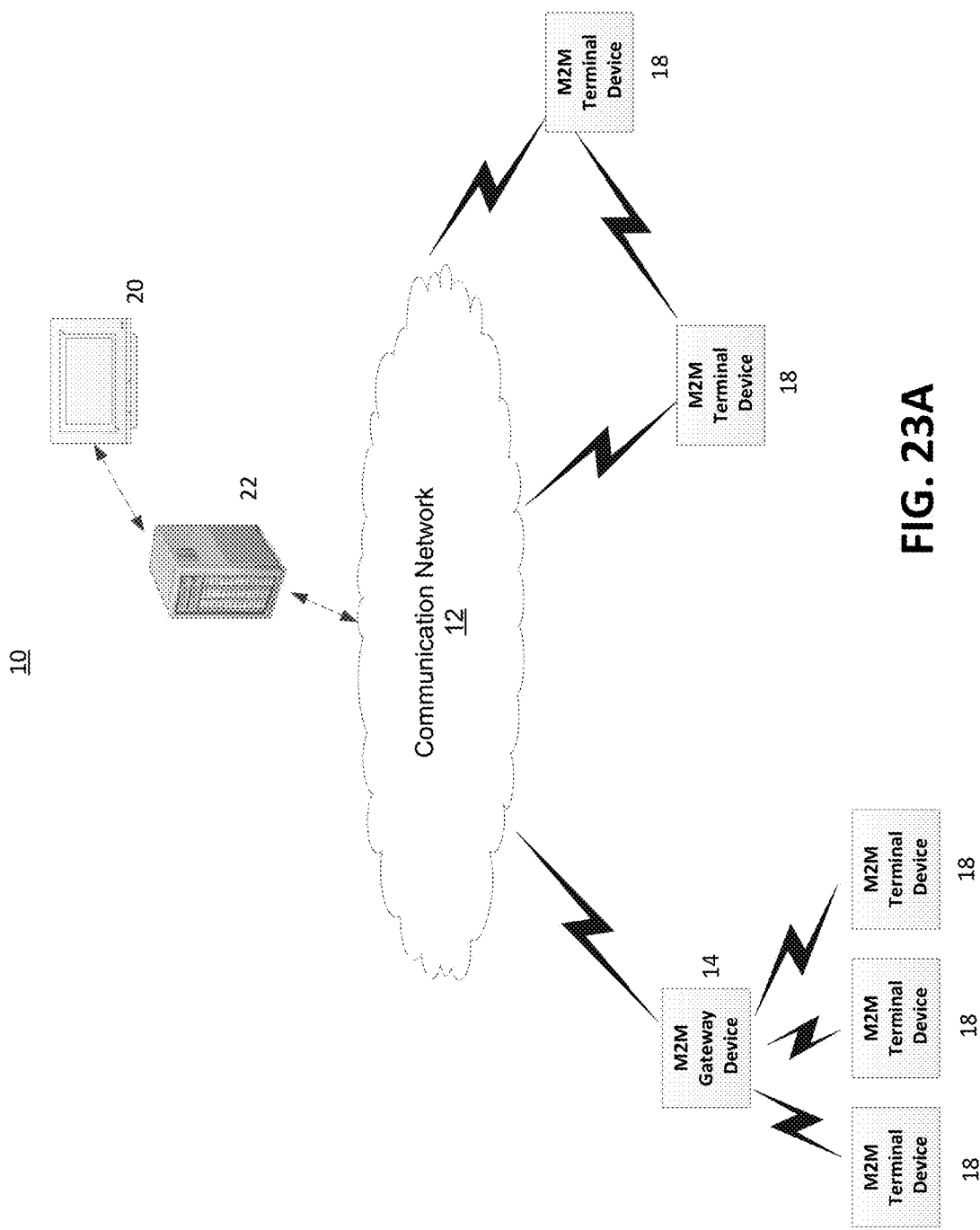
FIG. 23A is a system diagram of an example machine-to-machine (M2M) or Internet of Things (IoT) communication system in which the disclosed subject matter may be implemented.
Figure 23B:
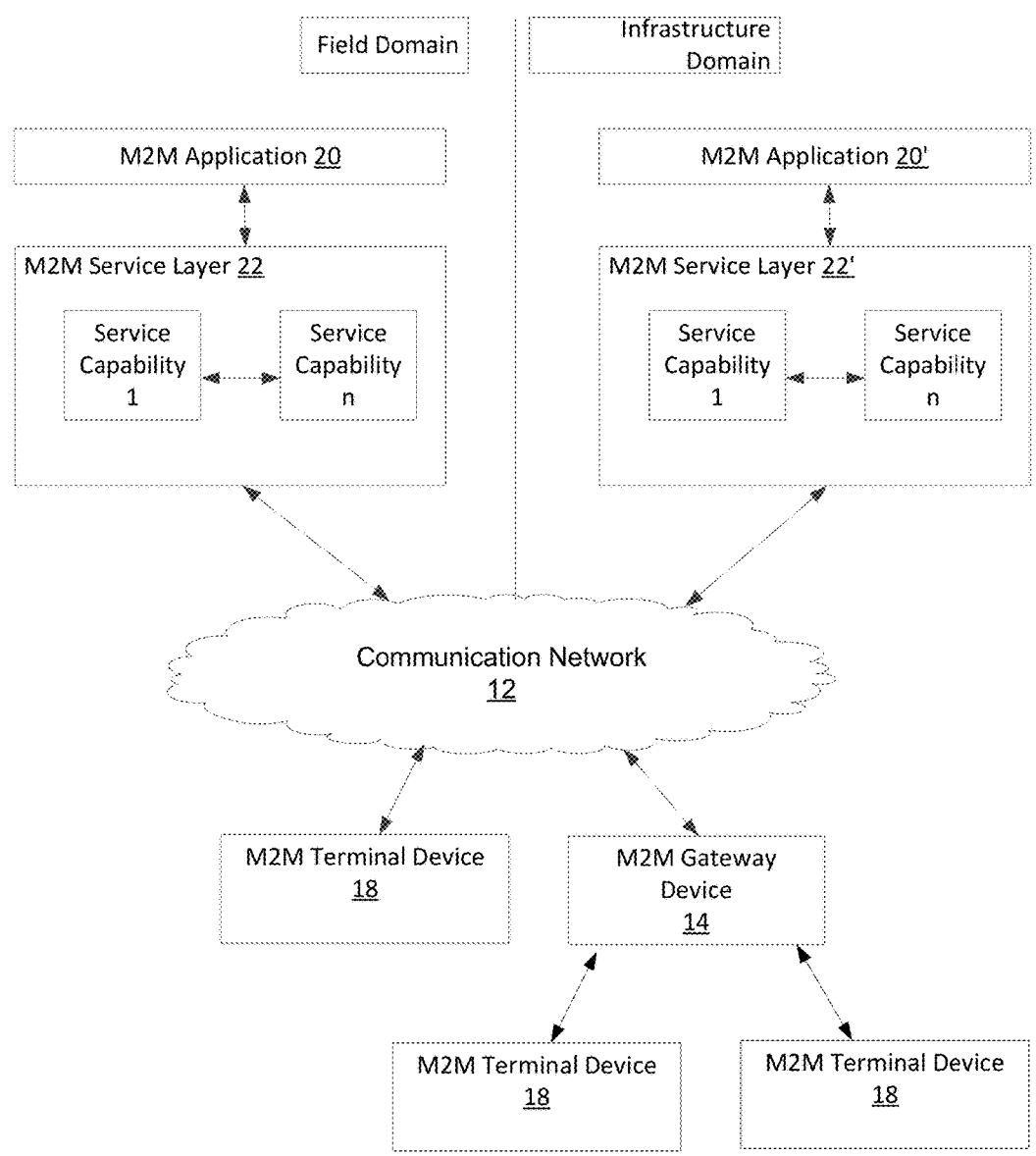
FIG. 23B is a system diagram of an example architecture that may be used within the M2M/IoT communications system illustrated in FIG. 23A.
Figure 23C:
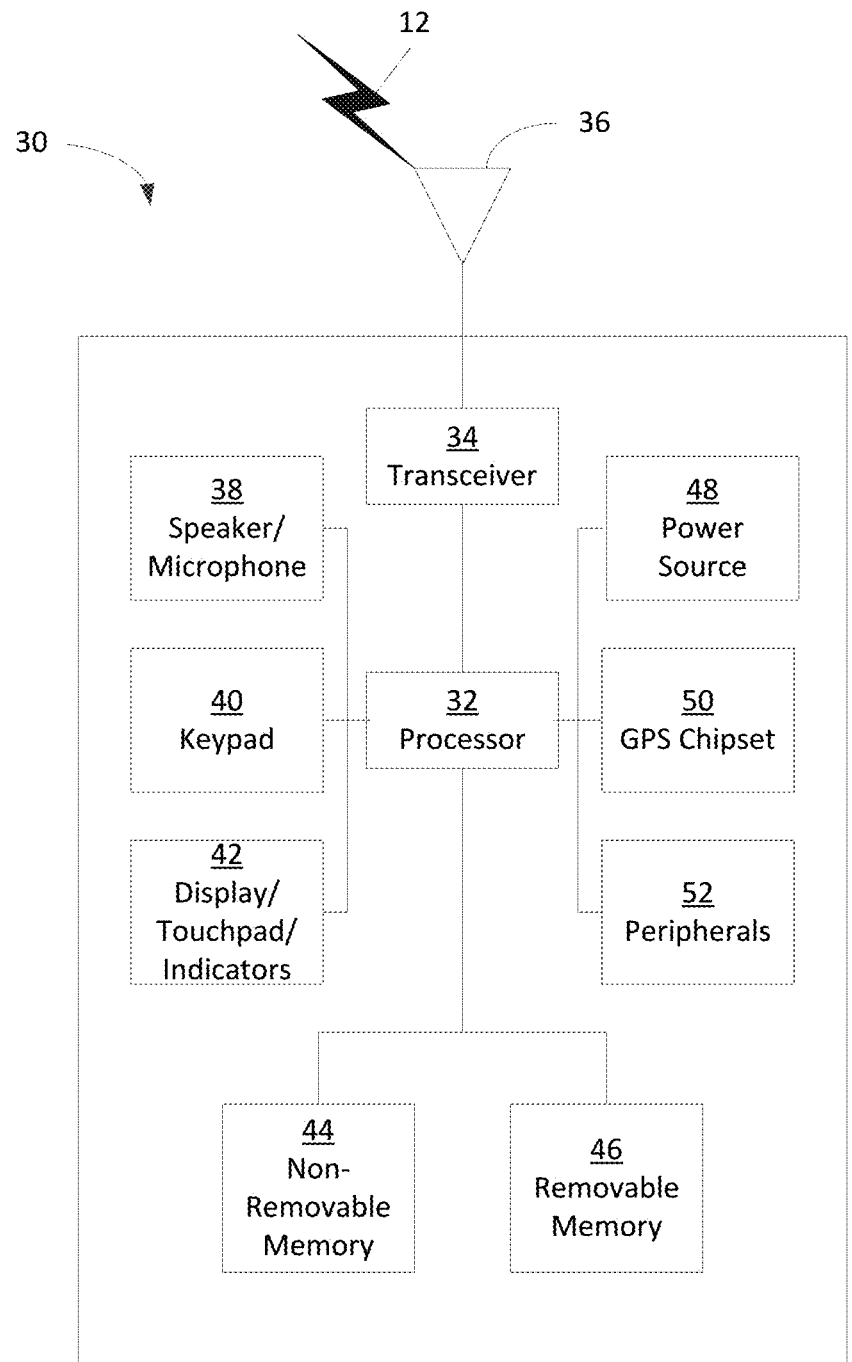
FIG. 23C is a system diagram of an example M2M/IoT terminal or gateway device that may be used within the communications system illustrated in FIG. 23A.
Figure 23D:
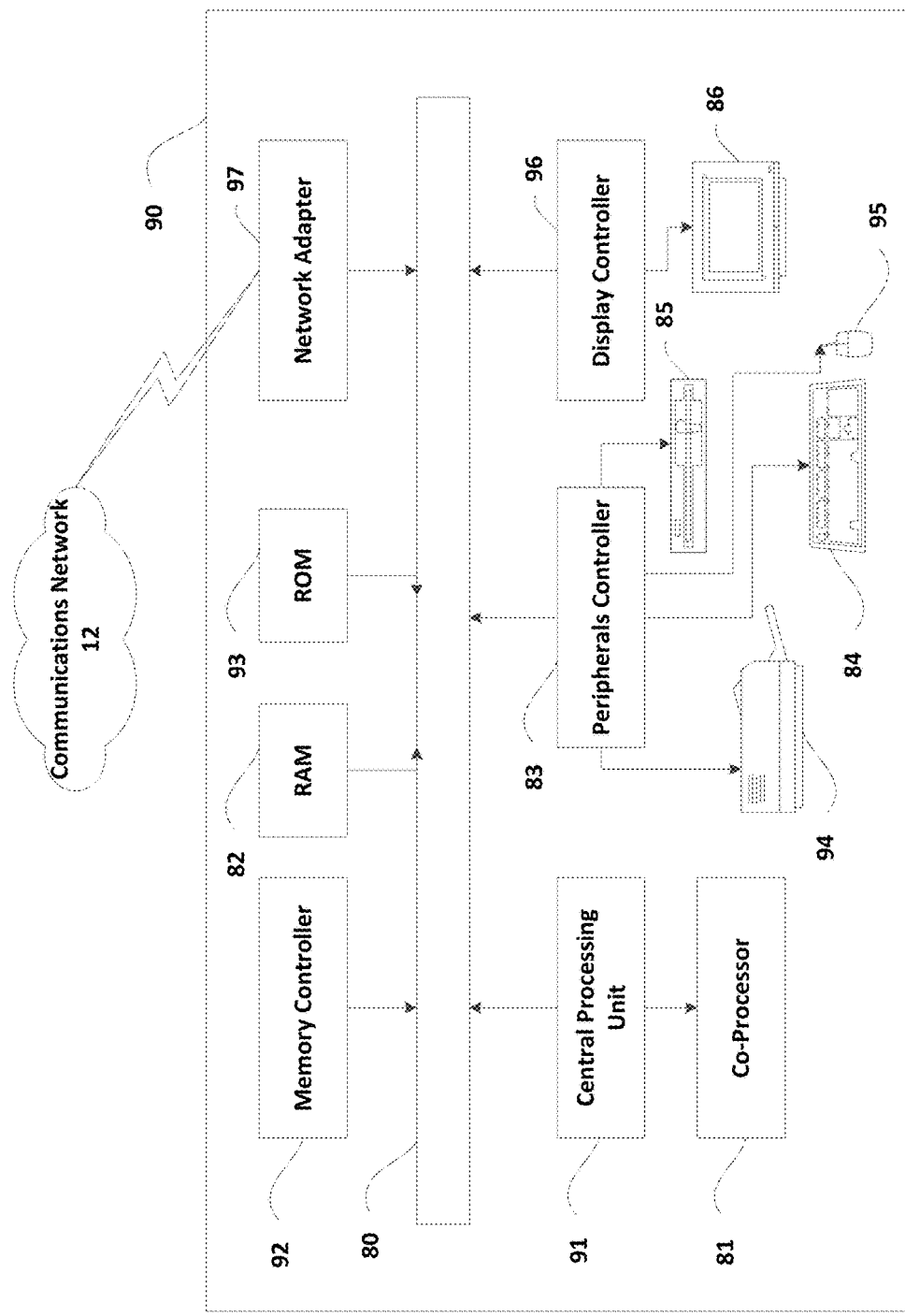
FIG. 23D is a block diagram of an example computing system in which aspects of the communication system of FIG. 23A may be embodied.

It is understood that the entities performing the steps illustrated in FIG. 13-17 and FIG. 19, among others, are logical entities that may be implemented in the form of software (e.g., computer-executable instructions) stored in a memory of, and executing on a processor of, a device, server, or computer system such as those illustrated in FIG. 23C or FIG. 23D. That is, the method(s) illustrated in FIG. 13-17 and FIG. 19 may be implemented in the form of software (e.g., computer-executable instructions) stored in a memory of a computing device, such as the device or computer system illustrated in FIG. 23C or FIG. 23D, which computer executable instructions, when executed by a processor of the computing device, perform the steps illustrated in FIG. 13-17 and FIG. 19. In an example, with further detail below with regard to the interaction of M2M devices, originator 161 of FIG. 15 may reside on M2M terminal device 18 of FIG. 23A. Originator 161, registrar node 164, and service node 165 of FIG. 15 may reside on M2M gateway device 14 of FIG. 23A.

Figure 13:
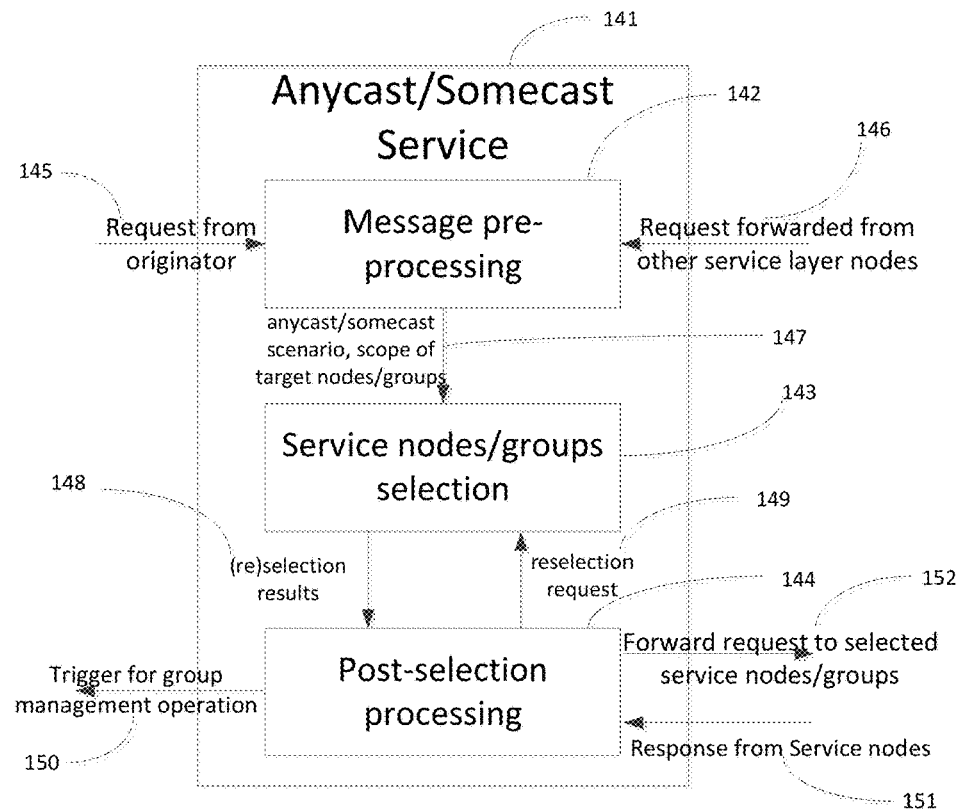
FIG. 13 illustrates an exemplary architecture of somecast/anycast service.

Herein, the service for supporting service layer anycast/somecast may be referred to as somecast/anycast service (SAS). FIG. 13 is an exemplary illustration of architecture 141 of SAS, which shows sub-functions and interactions with other service layer entities. The sub-functions as shown in FIG. 13 and further discussed below include message pre-processing 142 (see FIG. 14), service nodes/groups selection 143, and post-selection processing 144.

Figure 14:
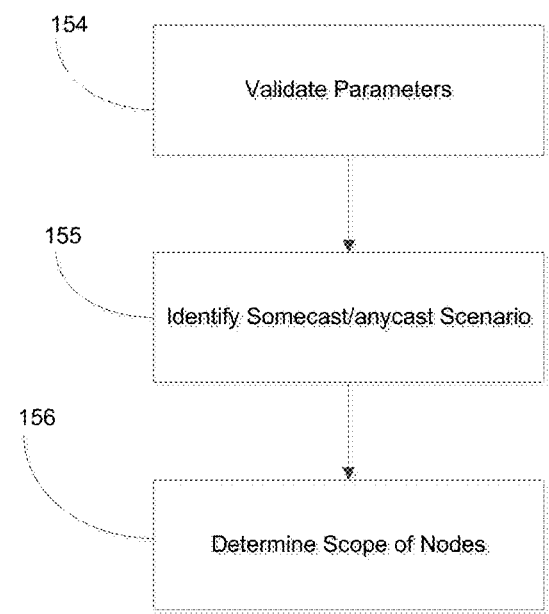
FIG. 14 illustrates an exemplary method for message pre-processing.

FIG. 14 illustrates an exemplary method for message pre-processing. At block 154, parameters are validated. For example, parameters in the message are checked to determine if the values and operations required by the message are valid or not. The information and parameters for enabling SAS is discussed in more detail herein. For example, if a <container> resource only supports retrieve operation for somecast, any other operation on this resource will be considered invalid for anycast/somecast. If the registrar node identifies that somecast/anycast is set in the request, then SAS will start to process the request message.

With continued reference to FIG. 14, at block 155, the anycast/somecast scenario is identified. The proper scenario of anycast/somecast may be based on information in a received message. For example, there may be a determination whether the scenario is anycast or somecast, whether it is group based or non-group based, or if multiple groups are involved for the somecast, among other things.

At block 156, the scope of the service nodes are determined. This is mainly for a non-group based scenario, since an originator usually defines the scope in a request message for group based scenario. Registrar node determines which service nodes should be selected from what scope/area based on the information in the request message for a non-group based case. Identifying scenario and determining the scope is introduced in call flows discussed herein.

With reference now to FIG. 13, message pre-processing 142 may have the following interactions with other functions or service layer entities. At 145, message pre-processing 142 may receive a request from an originator for anycast or somecast. As discussed herein an originator may be a M2M device 18 as discussed with regard to FIG. 23A-FIG. 23D. At 146, message pre-processing 142 may receive a request that was forwarded from other service layer nodes for anycast or somecast. In this case, the group hosting node may be selected and receive the forwarded request, and select one or more group members for anycast or somecast. At 147, message pre-processing 142 may send an identified anycast/somecast scenario, scope of service nodes/groups, or anycast/somecast parameters to service nodes/groups selection 143.

With continued reference to FIG. 13, there may be service nodes/groups selection 143, which selects the service nodes or groups based on the scope determined by message pre-processing 142. In addition, service nodes/groups selection 143 may be triggered to perform reselection if original selected service nodes return a failed response or if there are any message losses. The selection process is usually performed based on the output of message pre-processing 142, as well as other parameters, such as selection method and criteria or how many service nodes are expected. It is also possible that only a single group is selected from multiple groups and the group hosting node selects the service nodes. Service node selection is introduced in call flows discussed herein. After selecting the service nodes or groups, the information of selected nodes or groups may be passed at 148 to post-selection processing 144. It is also possible that the selection process is triggered by reselection 149 when the selected service nodes or groups fail to perform the desired operations.

With continued reference to FIG. 13, there may be post-selection processing 144, which is responsible for handling tasks after the selection of service nodes or groups for anycast/somecast. The tasks may include forwarding at 152 the message to the selected service nodes or groups, processing the returned messages at 151, initiating retransmission if there is an error or message loss, and triggering other service layer functions (e.g., group management) at 150. For initiating the retransmission, it is likely to trigger the reselection process since the selected service node fails or rejects the request. Different ways for retransmission are discussed in more detail herein. For triggering other service layer operations, such as group management, this is optional depending on the originator request and service layer configuration.

The conventional service layer does not define information and mechanisms for supporting anycast and somecast service. Discussed in more detail below is information that may help enable anycast and somecast communication at the service layer. The information included in a request message from an originator (e.g., originator 161 of FIG. 15) for enabling service layer anycast and somecast may include one or more of the following information: an anycast/somecast indication, a number of service nodes, a group related type, a group ID, group selection enablement, a retransmission option, group management trigger, a service node ID requirement, and a selection criteria/method, among other things.

An anycast/somecast indication may indicate that the anycast/somecast communication is desired for an operation included in a request message. An indication of a number of service nodes may be used in a message for anycast/somecast communication. For anycast, the required number is 1. Any number that is greater than 1 implies somecast. With regard to group related type, it may indicate if the anycast/somecast operation is group based or non-group based. More than one group may be involved for an anycast/somecast process. If there is group based anycast/somecast, Group ID is indicative of a group identifier (e.g., URI of <group> resource).

A message associated with anycast/somecast may include a retransmission option, which indicates the retransmission approach that will be used when failure happens. The retransmission option parameter may include more than one option, which is assigned with different preferences. For example, under the retransmission option parameter there may be a set 'reselection' option or 'retransmission' option. With regard to reselection it may mean that if the selected service node returns a failed response, the registrar node first tries to reselect another service node. Only if the registrar node cannot find another qualified service node, it will retransmit the message to the selected service node. The retransmission approach is addressed herein. Just to be clear, the reselection option, for example, may be for selecting another service node (or the like) and sending a request when the first service node fails or rejects the request. The retransmission option, for example, may be retransmission of the request to the selected node.

A message associated with anycast/somecast may include group management triggering, which indicates a group management operation (e.g., create a new group, merge two groups) is triggered once the desired operation is successfully performed via anycast/somecast. The group management operation may also be triggered by certain group management policies and rules. For example, a service provider may set a rule that all the <container> resources created by the same application should be grouped together for easy management.

A message associated with anycast/somecast may include a service node ID parameter that indicates if the ID of selected service node is required in a response to an originator 161. Usually, originator 161 does not care about and is not aware of which service node is selected and performs the desired operation for anycast and somecast. In some cases, it would be beneficial if the service node ID or address is provided. For example, originator 161 requests to create three <container> resources to store some data. If originator 161 knows the ID of the service nodes that created the resource, originator 161 could directly access the service node for managing the new resource in the future.

A message associated with anycast/somecast may include a set of criteria or method for selecting the service node for anycast and somecast communication. In a first example for criteria or method for selecting the service node, there may be enablement of random selection, which indicates that service nodes or groups could be randomly selected within the scope. In a second example for criteria or method for selecting the service node, the service nodes may be selected based on location (could be either logical location or physical location), e.g., selected service node should be in the service provider 1's network. The location criteria may be configured by the originator. In a third example for criteria or method for selecting the service node, the service node may be selected based on load balancing. For example, the service nodes that have less traffic load than other potential service nodes. e.g., the group hosting node forwards the request to the sensor that is idle or serves less number of requests for retrieving temperature readings. In fourth example for criteria or method for selecting the service node, the service node may be selected based on routing. For example, selection based on a service nodes that has the least number of hops from the originator. In fifth example for criteria or method for selecting the service node, it may be based on underlying networking protocols. For example, service nodes may be selected based on supporting the same underlying transportation layer (e.g., CoAP) as originator 161. Lastly, there may be other context information taken into account for criteria or method for selecting the service node. For example, the originator could also specify context information, such as accuracy of sensing, computation capability, time awareness, and sleeping schedule.

Table 1 shows an example of request message that may be associated with FIG. 11. Attributes/parameters associated with somecast/anycast are provided in Table 1.

TABLE 1

Example of Request Message with Information for Somecast/Anycast

| Attribute | Value |
| --- | --- |
| anycastSomecastIndicator | set |
| numberOfAnycastSomecastNode | 1 |
| groupBasedIndication | Group based |
| groupID | URI of the <group> resource |
| groupSelectionRequired | disable |
| serviceNodeIDRequired | no |
| retransOption | Reselect a member |
| serviceNodeSelectionCriteria | Random select |

In addition, some information about anycast and somecast could be maintained at service layer, so that service layer could validate the parameters in the request message when receiving a request for anycast or somecast. For clarity, SAS may be a service, e.g., CSF in a CSE. But SAS also may be integrated into or otherwise provided along with other services. The somecast/anycast information may be configured and maintained at service layer by service layer owner/provider. In order to implement, there may be new attributes or parameters defined for the service layer. A first example attribute may be anycastSomecastEnable, which indicates that the anycast/somecast communication is enabled or not on a service node or a specific resource. A second example attribute may be supportOpAnycastSomecast, which indicates the types of operations allowed for anycast/somecast. For example, for some <container> resources storing temperature readings, only RETRIEVE operation may be allowed for anycast/somecast. In other words in this example, originator 161 cannot request to update or delete a sub-set of <container> resources via anycast or somecast. A third example attribute may be mixedTypesEnable, which indicates if an operation may be performed on mixed types of service nodes or resources through somecast. This is related to group, which contains a group of member resources. The type of member resources could be the same or different. mixTypeEnable means if the originator could request to perform an operation on different types of member resources via somecast.

Figure 15:
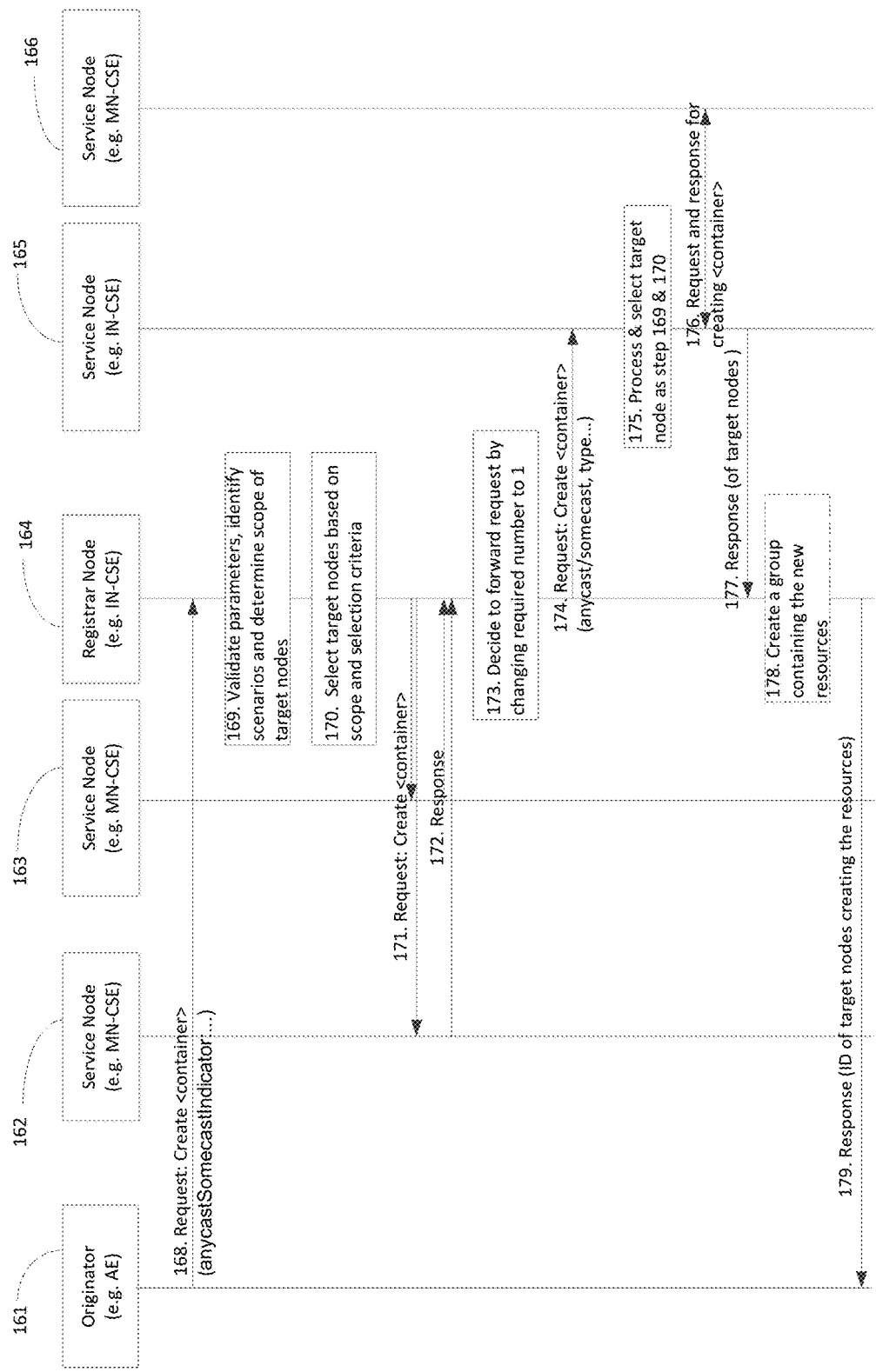
FIG. 15 illustrates an exemplary method flow for non-group based anycast/somecast at the service layer.

FIG. 15 illustrates an exemplary method flow for non-group based anycast/somecast at the service layer. Discussed below are procedures for supporting non-group based anycast/somecast at service layer. Non-group based anycast/somecast is characterized by the originator not explicitly specifying any group information, while it may provide some conditions to help determine the scope of service nodes. The CREATE operation is used as an example and service node 166 is only reachable by service node 165. The procedures introduced below use somecast as an example, since anycast may be considered a special case of somecast, where the required number of service nodes is 1.

With continued reference to FIG. 15, at step 168, originator 161 (e.g., an application entity in oneM2M) sends a request to registrar node 164 for creating some <container> resources. In the request message of step 168, somecast associated parameters may be specified in the request message. For example, the somecast parameters may be set as shown in Table 2. Although it is not shown in the call flow, there are alternative ways for indicating the number of service nodes. In one alternative example, the request message of step 168 includes a range of number of service nodes, e.g., (2, 5) which indicates a minimum number is 2 and maximum number is 5. This gives registrar node 164 some flexibility for selecting the nodes. Another way is that the request message of step 168 has set a 'numberflexibilityIndicator' flag to allow registrar node 164 to select a flexible number of service nodes. If registrar node 164 does not support anycast/somecast, then the request message of step 168 may be treated as invalid message since some parameters are not supported, the request message returns a response that includes anycast/somecast is not enabled, or the like.

TABLE 2

Request Message Parameters for Somecast/Anycast for FIG. 15

| Attribute | Value |
| --- | --- |
| anycastSomecastIndicator | set |
| numberOfAnycastSomecastNode | 3 |
| groupBasedIndication | Non-group based |

TABLE 2-continued

Request Message Parameters for Somecast/Anycast for FIG. 15

| Attribute | Value |
|---|---|
| groupID | n/a |
| groupSelectionRequired | n/a |
| serviceNodeIDRequired | yes |
| retransOption | Reselect a member |
| serviceNodeSelectionCriteria | Service nodes should be within the service provider 1's network, and MN-CSE is preferred |

With continued reference to FIG. 15, at step 169, registrar node 164 receives the request message of step 168 and validates the parameters in the request message. For example, registrar node 164 checks if anycast/somecast is allowed for creating new resources. Then registrar node 164 identifies the scenario for anycast/somecast. In this example, non-group based somecast is specified, therefore registrar node 164 determines the scope of service nodes. For determining the scope, registrar node 164 may refer to the selection criteria in the request message of step 168 and the service layer network it registers with. At step 170, registrar node 164 selects the service nodes based on the selection criteria and determined scope. In the method flow of FIG. 15, service node 163 and service node 162, which register with registrar node 164, are selected. Registrar node 164 then generates a request message for each selected service node. At step 171, registrar node 164 sends CREATE request to the selected nodes respectively (e.g., service node 163 and service node 162). At step 172, response messages are received by registrar node 164. The response messages may be sent by service node 163 and service node 162 when they successfully complete the CREATE operation. Here it is assumed that the selected nodes (e.g., service node 163 and service node 162) successfully perform the operation. Methods to address the failed case and corresponding retransmission process are discussed herein.

With continued reference to FIG. 15, registrar node 164 only knows three service nodes that are candidates in this case, but one is IN-CSE which is not qualified. A qualified service node means that the service node meets the conditions in the request message of step 168. Registrar node 164 determines if it is necessary to forward the request to other service nodes for further selection. In general, it is possible that registrar node 164 cannot select as many service nodes as required because it does not connect to the number of service nodes, or does not connect to the number of qualified nodes, or some qualified nodes reject the request. In this case at step 173, registrar node 164 may forward an anycast request to service node 165, which will select one more service node to complete the request. As a reminder anycast may be considered a special case of somecast, where the required number of service node is 1. Therefore, if step 172 is successful, then the step 173 thru step 179 are not needed for anycast.

With continued reference to FIG. 15, at step 174, registrar node 164 forwards the somecast request message to service node 165. The contents in this message may be substantially the same as contents of the request message of step 168 except that the number of service nodes is 1, indicating that anycast is expected. Two service nodes selected by registrar node 164 already created a resource and therefore only one more is needed. At step 175, service node 165 follows operations that are similar to step 169 and step 170. At step 179, operations that are similar to step 171 and step 172 are followed. At step 177, registrar node 164 receives a response message associated with the request message of step 174. The response message may indicate parameter, or indicate the request is completed, among other things.

With continued reference to FIG. 15, at step 178, once the request of step 168 is accomplished (e.g., three service nodes successfully create <container> resources in this case), registrar node 164 may determine if it is necessary to create a group for managing the newly created resources. Doing this may have some benefits. For this case, the three new <container> resources could be managed, discovered and accessed through group management method, which is more efficient. Another possible case is that originator 161 may request to add the three new resources into an existing group, which contains a list of resources created and managed by originator 164. Whether to take any group related operation may depend on different factors. For example, one factor may be whether originator 164 explicitly requests a specific group management related operation in a request message. Another factor may be based on a determination of whether a specific group management operation should be performed based on service layer configuration. For example, a service layer platform may be configured in a way that requires the resources that are created through somecast to be grouped together for efficient management as long as the resources are of the same type. In addition, group related operation for step 178 is just an example in this process. This optional step could relate to other aspects, such as access control and charging. At step 179, registrar node 164 sends a response to originator 164, which may include the IDs of those service nodes creating the requested resources associated with the request of step 168.

With continued reference to the scenario of FIG. 15, in the case that registrar node 164 fails to select as many service nodes as requested, instead of forward somecast request to anther service node for performing another round of selection, an alternative way is that registrar node performs discovery process, and obtains more information about some other qualified service nodes that could be considered. This discovery step could be initiated from step 173 as shown in FIG. 15. For enabling the discovery at registrar node 164, originator 161 may setup an optional flag in the request message called "optionalAction," which indicates what to do if registrar node fails to find the requested number of service nodes. The possible values of "optionalAction" could be none, discovery, forwarding, etc.

Figure 16A:
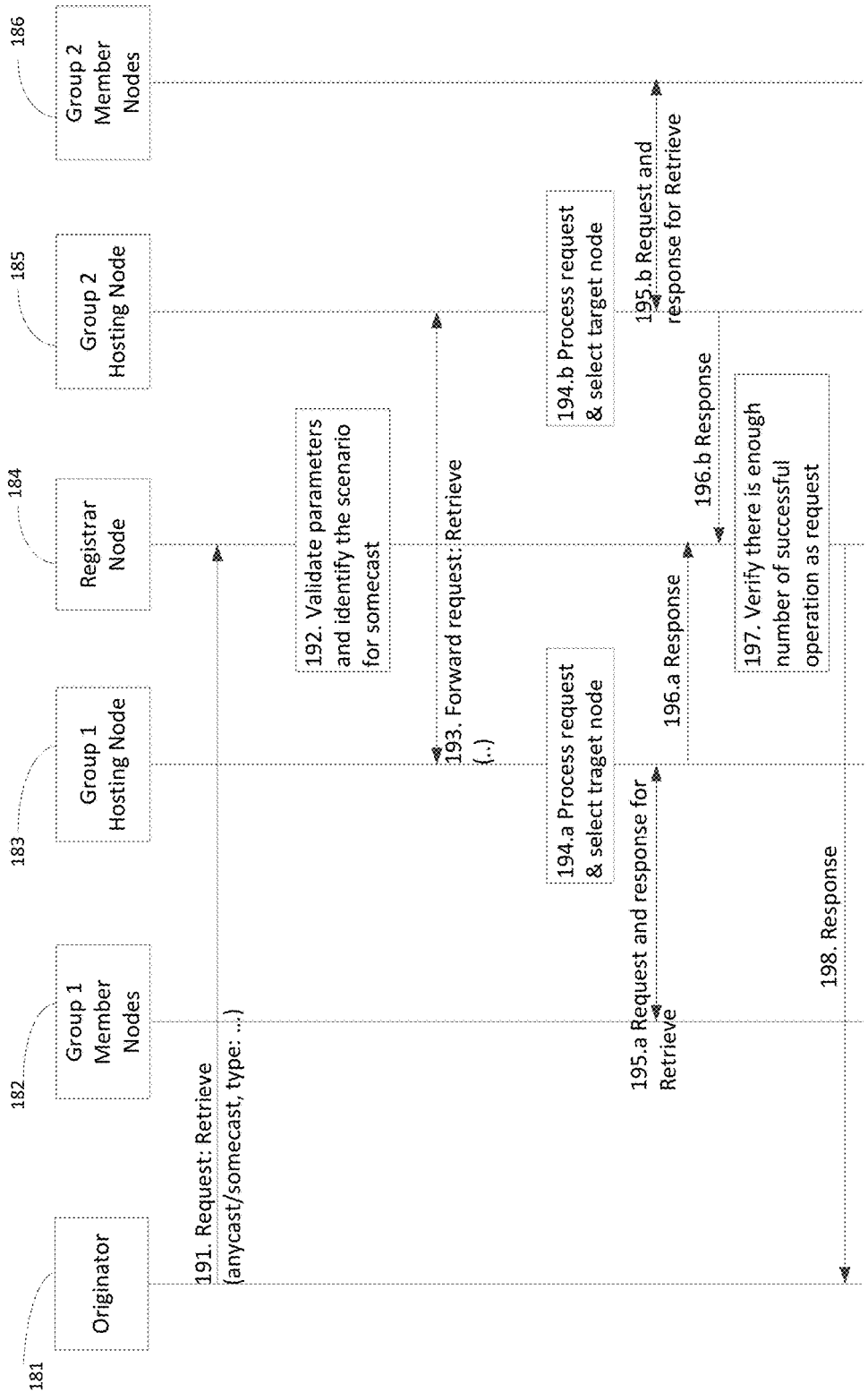
FIG. 16A illustrates an exemplary method flow where group selection is NOT performed.
Figure 16B:
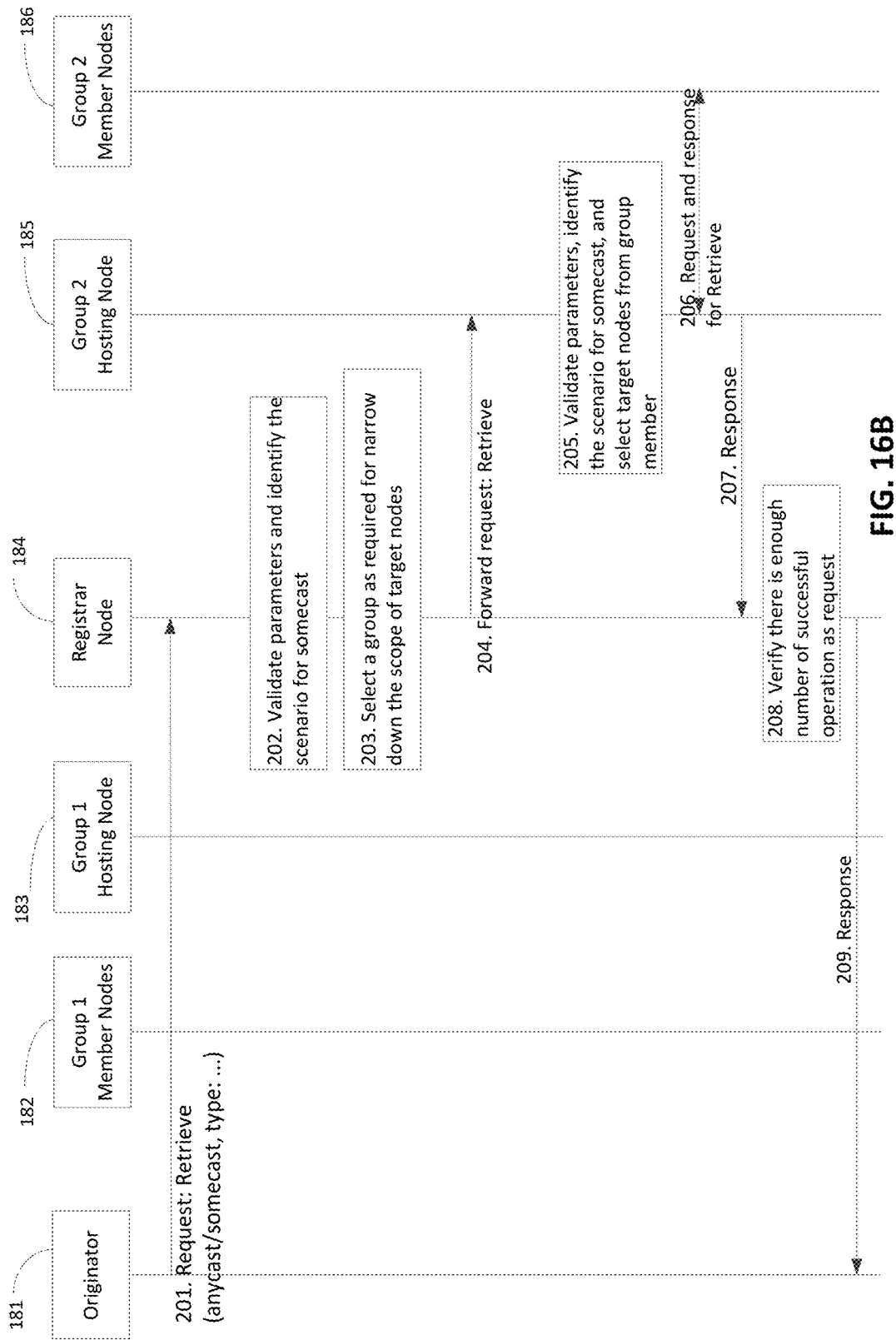
FIG. 16B illustrates an exemplary method flow where group selection is performed.

FIG. 16A and FIG. 16B illustrate exemplary method flows for group based anycast/somecast at service layer. In contrast to a non-group based scenario, originator 161 provides group information, such as group ID, URI of <group> resource, or a list of addresses of service nodes. More than one group may be involved for group based anycast and somecast. For example, an application that is interested in temperature readings of an area may find that several groups of sensors managed by different operators could provide the data, so the application could inform its registrar node 161 about all these groups for retrieving the temperature data via anycast or somecast. Therefore, registrar node may be required to select a group before forwarding the request message to any of group hosting node. The multi-group scenario is the general case for the one-group scenario, where the group selection operation is skipped.

FIG. 16A illustrates an exemplary method flow where group selection is NOT performed, while FIG. 16B illustrates an exemplary method flow where group selection is performed. For both FIG. 16A and FIG. 16B, a RETRIEVE operation is used as an example.

With reference to FIG. 16A, at step 191, registrar node 184 receives a request for retrieving contents. In the request message of step 191, includes parameters related to anycast/somecast that are provided in Table 3. No group selection implies that registrar node does not need to select a group before forwarding the request message. Since originator 181 targets at two groups, the service node may be selected from only group 1, only group 2, or from both groups. FIG. 16A shows the procedure without group selection.

TABLE 3

Request Message Parameters for Somecast/Anycast for FIG. 16A

| Attribute | Value |
| --- | --- |
| anycastSomecastIndicator | set |
| numberOfAnycastSomecastNode | 3 |
| groupBasedIndication | group based |
| groupID | (URI of <group> resource, e.g., /group1HostingNode/<group>) |
| groupSelectionRequired | no |
| serviceNodeSelectionCriteria | preference for selecting the service nodes (e.g., a gateway node with more registered users/clients is preferred, a server in the infrastructure field is preferred) |

With continued reference to FIG. 16A, at step 192 registrar node 184 validates the parameters in the request message of step 191. Registrar node 184 identifies that two groups are involved for the somecast, and group selection is not required. At step 193, registrar node 184 sends a request message to the group hosting nodes, group 1 hosting node 183 and group 2 hosting node 185. Registrar node 184 provides the number of service nodes and group ID in each request it forwards. Before forwarding the request, registrar node 184 makes a decision to set number of nodes desired to one for group 1 and number of nodes desired to two for group 2. At step 194a, group 1 hosting node 183 processes the request message of step 193, and identifies that it is group based anycast. Therefore, group 1 hosting node 183 selects one of its group members to perform the requested operation. The request of step 193 may include the following: anycast/somecast, type: group, required number: 1 (2), target: /group1 (/group2), Content to retrieve, selectionCriteria. At step 194b, SAS in group 2 hosting node 185 follows a similar process as step 194a. However group 2 hosting node 185 selects two group members to perform the requested operation, since the request from registrar node indicates that group based somecast is requested with two service nodes.

With continued reference to FIG. 16A, at step 195a, group 1 hosting node 183 sends requests to the selected group member of group 1 member nodes 182, and receives the response accordingly. At step 195b, it is a similar process to step 195a for exchanging request and response messages with selected group members (e.g., group 2 member nodes 186). At step 196a and step 196b, group 1 hosting node 183 and group 2 hosting node 185 send response messages to registrar node 184, respectively, to indicate the requested operation has been successfully performed by selected group members of group 1 member nodes 182 and group 2 member nodes 186. At step 197, registrar node 184 verifies that the number of service nodes is enough to perform the operation as requested. At step 198, registrar node 184 sends originator 181 a response message associated with the request message of step 191.

FIG. 16B, associated with group selection, is discussed below. Step 201 and step 202 are similar to step 191 and step 192 of FIG. 16A. At step 203, in the request message of step 201 the group selection is indicated as required, the registrar node is responsible for selecting a group over another before forwarding the somecast request. In this case, group 2 is selected. Registrar node 184 may make a selection based on selection criteria in the request message of step 201, based on service layer configuration maintained locally, or the like. For example, registrar node 184 may select the group with more group members, which means a larger selection base. Registrar node 184 may select the group that has more service layer clients or subscribers, so that more clients or subscribers may be notified the new feature/service by performing the desired operation via somecast. At step 204, registrar node 184 sends the somecast request to group 2 hosting node 185 by updating the group ID from the request of step 201. The request of step 204 may include the following: anycast/somecast, type: group, target: /group2 required number: 3, Content to retrieve, selectionCriteria. Step 205 through step 207 follows similar operations as step 175 through step 177 of FIG. 15. At step 208, registrar node 184 verifies that there are enough number of successful operations as requested. At step 209, registrar node 184 sends a response to originator 181. In alternative, step 202 may also be done by group 2 hosting node 185 when group hosting node 185 receives the anycast/somecast request from registrar node 184. In this sense, registrar node 184 may be considered to directly select the group and decide the required number for each group.

Figure 17:
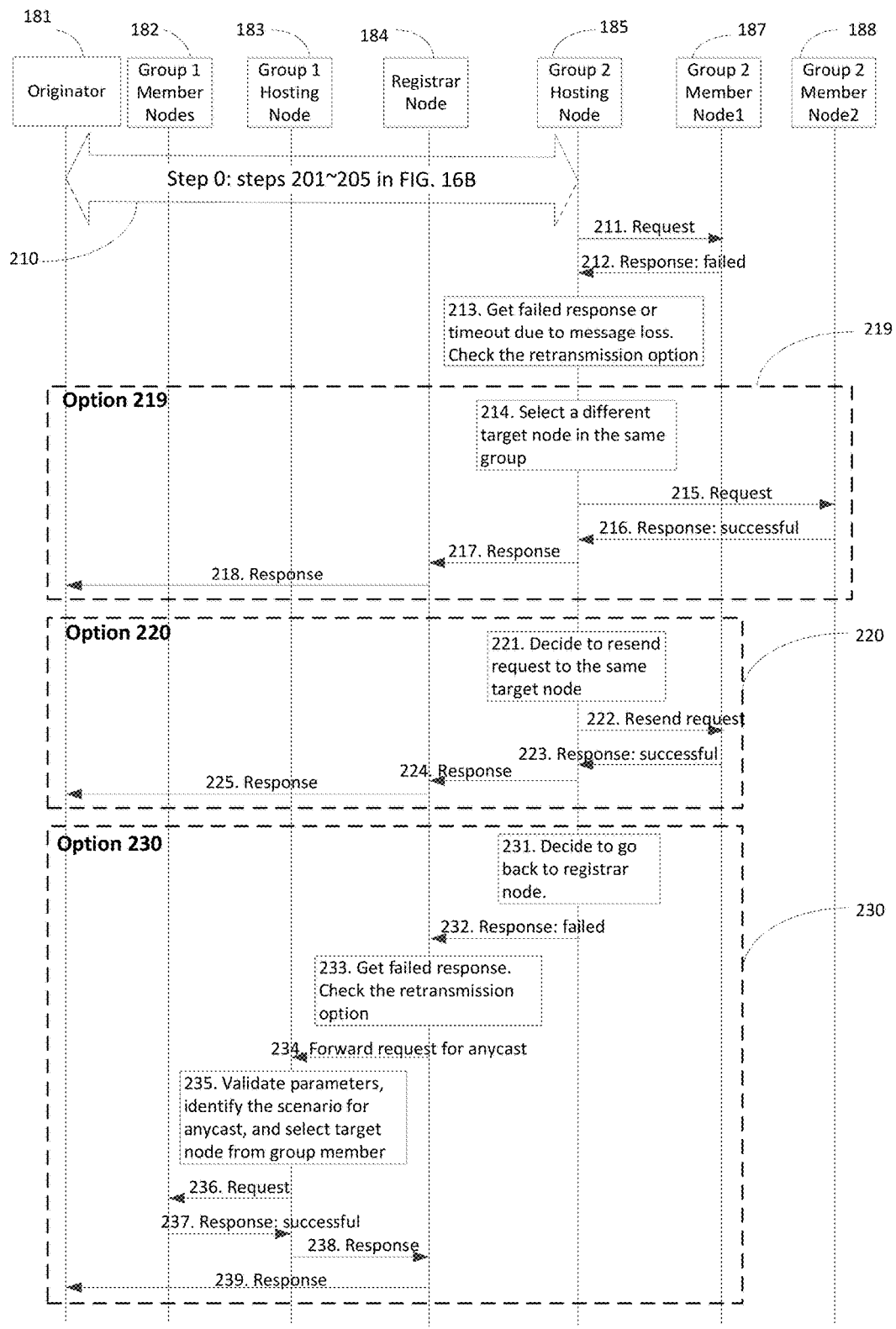
FIG. 17 illustrates exemplary options for performing retransmission operations.

Discussed below are retransmission approaches. FIG. 15, FIG. 16A, and FIG. 16B show the procedures of both non-group based and group based anycast/somecast assuming that there are neither processing errors nor message losses during the process, so that retransmission is not required. There may be retransmission for message loss (e.g., packet loss at underlying protocol layer) or processing error (e.g., request rejected). There are multiple options for performing retransmission operations which are illustrated in FIG. 17. For option 219, in summary and discussed in more detail below, registrar node 184 selects another service node for a non-group based scenario, or group hosting node selects a different group member node from the same group for group based scenario. For option 220, in summary and discussed in more detail below, registrar node 184 retransmits the request to the selected service node for non-group based scenario, or group hosting node retransmits the request to selected group member node. Under some circumstances, this option should not be used. For example, the selected service node rejects the request due to some access control issue, or selected service node just deleted the resource, while the anycast request is to retrieve the data from the deleted resource. For option 230, in summary and discussed in more detail below, group hosting node returns to the registrar node when it fails to get successful response from selected group members. It goes to a different group for selecting new service node. This option is usually for group based scenario when multiple groups are involved With reference to FIG. 17, step 210 contains a series of steps for pre-configuration, which follow the step 201 through step 205 as shown in FIG. 16B, except that originator 181 requests only one service node to perform the operation (e.g., anycast). The use of anycast in this example is mainly for ease of illustration of retransmission approach. Originator 181 initiates an anycast request with two groups involved. Registrar node 184 performs the group selection request and sends the somecast request to group 2 hosting node 185. Then group 2 hosting node 185 selects one group member. At step 211, group 2 hosting node 185 sends a request message to the selected group member for perform the requested operation as provided in step 210. At step 212, to illustrate the retransmission, there is a failed response received by group 2 hosting node 185 indicative of being from group 2 member node 187. At step 213, group 2 hosting node 185 checks the anycast request message to determine what retransmission is required, if any. If originator 181 does not specify any retransmission method, a default method will be used. It is also possible that group 2 hosting node 185 never gets the response due to the message loss. In this case, group 2 hosting node 185 may initiate the retransmission process when the response times out.

With reference to option 219 of FIG. 17, at step 214, group 2 hosting node decides to select another group member, and it selects group 2 member node 188. It is possible that group 2 hosting node 185 cannot find any qualified group member that meets the requirements set by originator 181. In this scenario, group 2 hosting node 185 may utilize the alternative retransmission method instead. Multiple retransmission methods may be specified by originator 181, therefore if the first option does not work (e.g., no more qualified group member in this case), group 2 hosting node 185 may turn to the second option. At step 215 and at step 216, request and successful response exchange, respectively, take place between group 2 hosting node 185 and group 2 member node 188. At step 217, registrar node 184 receives a response associated with request of step 210. At step 218, registrar node 184 sends a response associated with request of step 210 to originator 181.

With reference to option 220 of FIG. 17, at step 221, for this option, group 2 hosting node 185 decides to re-transmit the request to the selected group member (e.g., group 2 member node 187). Before making this decision, group 2 hosting node 185 may verify that it is possible for group 2 member node 187 to successfully perform the requested operation. For example, if group 2 member node 187 already deleted the resource storing the content for retrieve operation, then group 2 hosting node 185 should not use option 220 for retransmission, and turn to an alternative option. Group 2 hosting node 185 may check the response code in the response of step 212 to identify the failure reason. At step 222 and at step 223, request and successful response exchange, respectively, take place between group 2 hosting node 185 and group 2 member node 187. At step 224, registrar node 184 receives a response associated with request of step 210. At step 225, registrar node 184 sends a response associated with request of step 210 to originator 181.

With reference to option 230 of FIG. 17, at step 221, group 2 hosting node 185 goes back to registrar node 184 for retransmission. In addition, group 2 hosting node 185 may use this option because the previous two options did not work (e.g., no more qualified group member and the selected group member cannot perform the required operation). At step 232, group 2 hosting node 185 sends response to registrar node 184 indicating the failure reason. At step 233, registrar node 184 identifies the failure reason and retransmission option, and decides to go to group 1 for the anycast request. At step 234 through step 239, registrar node sends anycast request to group 1 hosting node 183, which follows the steps for anycast. These steps are similar to step 204 through step 209 as shown in FIG. 16B.

Figure 18:
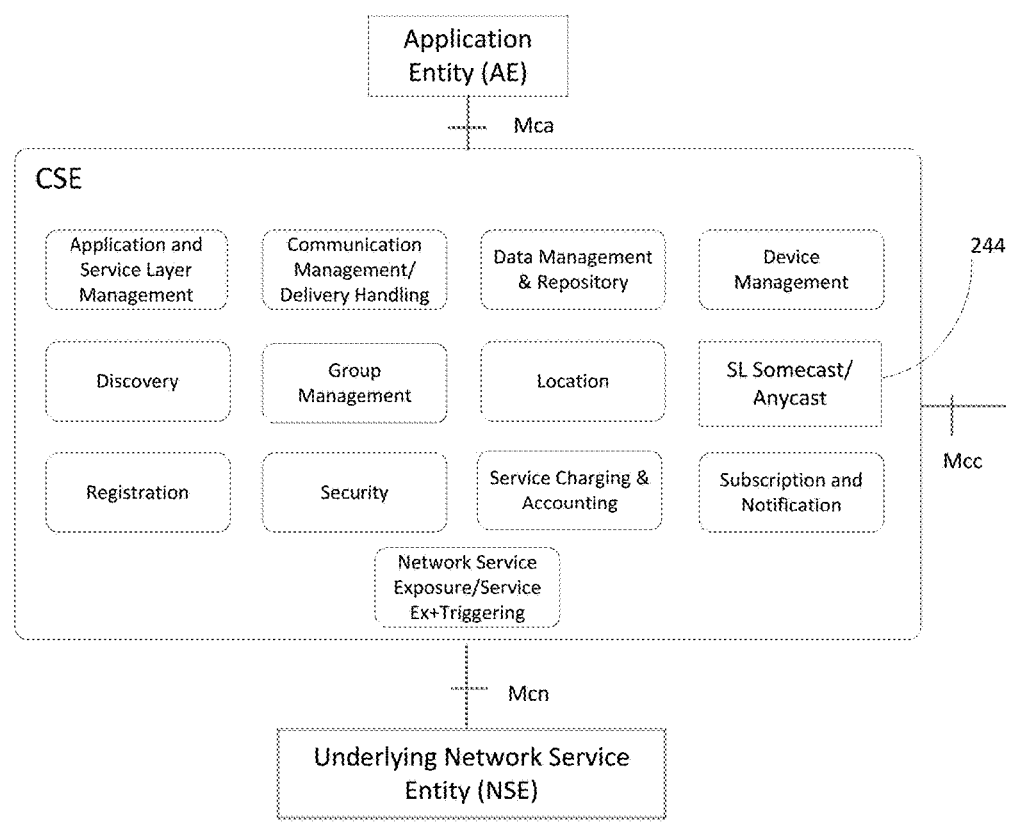
FIG. 18 illustrates an exemplary implementation of somecast/anycast service as a SL somecast/anycast CSF based on oneM2M functional architecture.

FIG. 18 illustrates an example for implementing the disclosed SAS as a new SL somecast/anycast CSF 244 based on the conventional oneM2M functional architecture. Alternatively, the disclosed SAS could also be implemented and added as a part of the conventional group management CSF.

Common attributes shown in Table 4 below are disclosed for a resource to enable anycast and somecast.

TABLE 4

New Common Attributes

| Attributes Name | Multiplicity | Description |
| --- | --- | --- |
| anycastSomecastEnable | 0 . . . 1 | This attribute indicates if anycast and somecast is enabled for the resource that contain this common attribute. If this attribute is not present, anycast/somecast is considered enabled by default. |
| supportOpAnycastSomecast | 0 . . . 1 (L) | This attribute provides a list of operations that could be performed on the resource through anycast or somecast. In other words, only operations specified in this list can be performed through anycast and somecast. For example, may be RETREIEVE is allowed on a group of container via somecast/anycast, but DELETE is not allowed. |

Requests over Mca and Mcc reference points, from an originator (e.g., originator 181) to a receiver (e.g., registrar node 184) may contain the parameters as shown in Table 5.

TABLE 5

New Parameters in Request Message

| Request message parameter\Operation | Description |
| --- | --- |
| anycastSomecastIndicator | Indicate requested operation is desired to be performed through anycast or somecast |
| numberOfAnycastSomecastNode | Indicate the required number of service nodes for anycast or somecast |
| groupBasedIndication | Indicate if it is group based or non-group based anycast/somecast |
| groupID | Provide group ID for group based case. This parameter is used for group based scenario. |
| retransOption | Indicate the retransmission approach for anycast/somecast if necessary. It could be more than one option specified |
| groupSelectionRequired | Indicate if group selection is required when multiple groups are involved for anycast/somecast. This parameter is used for group based scenario. |
| serviceNodeIDRequired | Indicate if the service node ID |

TABLE 5-continued

New Parameters in Request Message

| Request message parameter\Operation | Description |
|---|---|
| | is required in the response message when the operation is successfully performed by the service node |
| serviceNodeSelectionCriteria | Indicate a list of criteria and method for selecting the service nodes |
| reliableRequirement | If set, implying that more service nodes will be selected than required number for reliability. More details will be discussed herein. |
| numberflexibilityIndicator | Indicate a range for the required number of service nodes, e.g., [3, 5] means at least 3 nodes are selected, and 5 are selected at most. |
| verifictionOption | Indicate if the receiver CSE needs to verify the somecast/anycast request when receiving it |
| optionalAction | Indicate the action for non-group based scenario when the receiver CSE does not know enough about the number of service nodes as requested. The possible values of "optionalAction" could be none, discovery, forwarding, etc. |

It is possible to support group based anycast/somecast through conventional oneM2M group management. Some attributes are disclosed for <group> resource as listed in Table 6.

TABLE 6

Attributes of <group> Resource

| Attributes Name | Multiplicity | Description |
|---|---|---|
| defaultAnycastSomecastRetransOption | 0 . . . 1 | This attribute indicates the retransmission approach for anycast/somecast if the originator does not specify any approach in the request |
| defaultSelectionMethod | 0 . . . 1 | This attribute indicates the default method of selecting the group members for anycast/somecast if the no approach is specified by any entity |
| mixTypeAllowed | 0 . . . 1 | This attribute indicates if somecast is allowed for performing operation on mix types of group members. |

Figure 19:
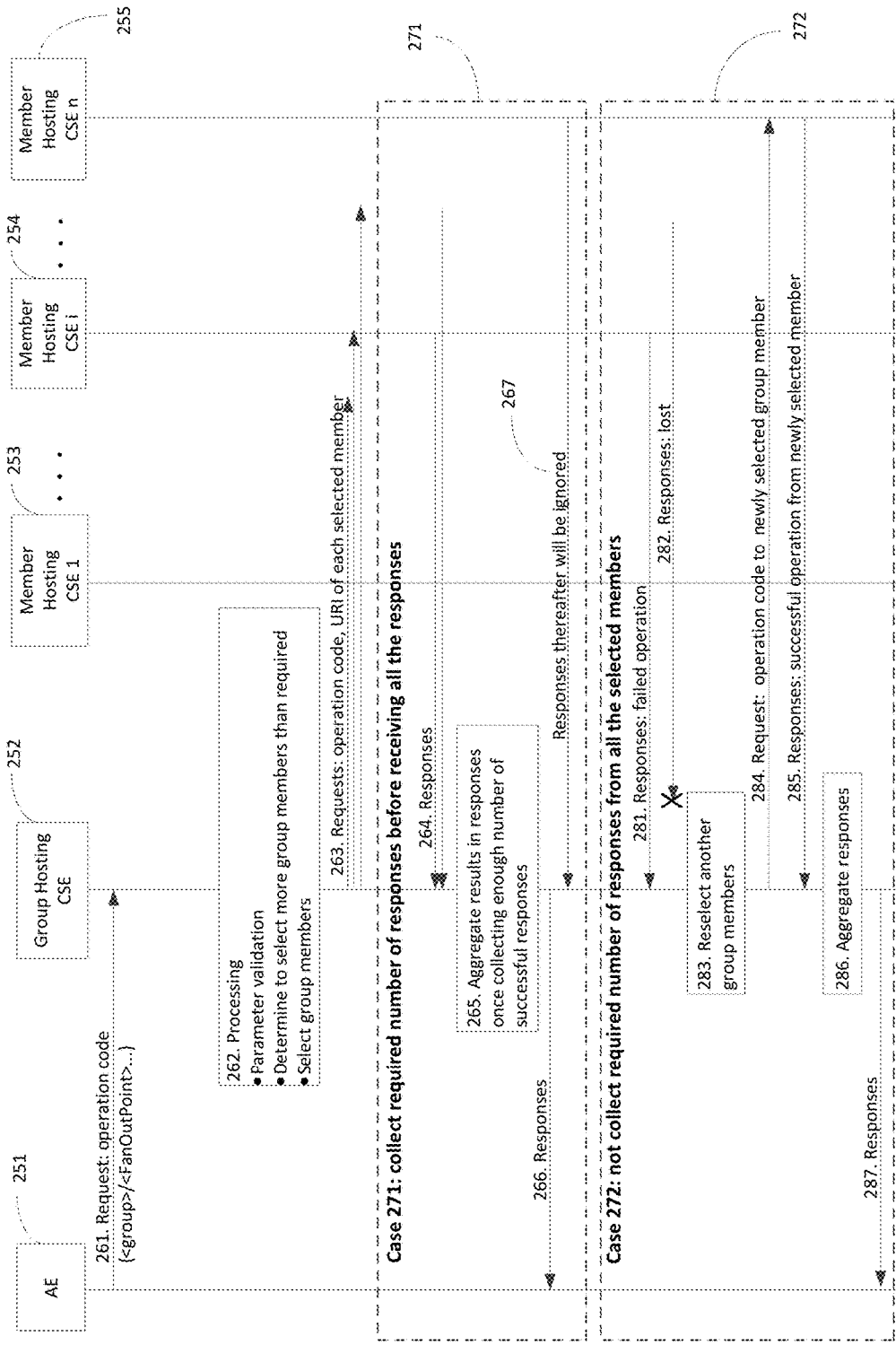

FIG. 19 illustrates exemplary somecast/anycast method flows for oneM2M group management or the like. In summary, in a first approach (e.g., case 271 of FIG. 19), group hosting CSE 252 selects the requested number of group members based on request from AE 251 (e.g., originator), and forwards the request to each selected member hosting CSE (e.g., member hosting CSE 254 or member hosting CSE 255). In a second approach (e.g., case 272 of FIG. 19), group hosting CSE 252 selects a number of group members that is more than the requested number by AE 251. Group hosting CSE 252 aggregates the responses and sends the aggregated response to AE 251 after collecting a sufficient number of responses. Group hosting CSE 252 may ignore responses after the sufficient number of responses has been reached. This may be useful for some application/services that are time sensitive. For example, a monitoring service provides real-time temperature readings from a nuclear plant to adjust the operation. If an emergency happens, it may be required to return the temperature readings reliably and quickly. There is a potential for some sensors to break down and group hosting CSE 252 may not be aware of that. This approach may provide a certain level of reliability for anycast/somecast in case selected group members have errors.

FIG. 19 is discussed in more detail below. At step 261, AE 251 sends a request targeting at the virtual resource <fanOutPoint> and requests two group members to perform the operations. The request may include the following: (<group>/<FanOutPoint>, anycastSomecastIndicator: set, numberOfAnycastSomecastNode: 2, groupBasedIndication: group based, serviceNodeSelectionCriteria: random selection, retransOption: reselect group member, reliableRequirement: reliability required). At step 262, group hosting CSE 262 may validate the received parameters found in the request message of step 261. For example, validation may include determining one or more of the following: if the request operation is supported for anycast/somecast; if the requested number of group member does not exceed the total number of group member, or if the requested somecast leads to operation on mixed type of group members and whether this is allowed or not, among other things. Also at step 262, the number of group members may be selected. This may be based on the requested number in the request message of step 261 or some application/service specific parameters. For example, an emergency monitoring and reporting service may request a certain level of "reliability" for reporting any emergency situation, so group hosting CSE may select more than actual needed member hosting CSE for creating subscription for an application that subscribes this service through anycast/somecast. This approach for selecting more than required may provide some margin in case that some selected nodes reject a request or there are errors/message loss. The main idea is that group hosting CSE selects more number of nodes than required by the originator. For example, originator requests to select 3 members, but group hosting CSE may select 5 members, so that even if 2 selected members rejects or disconnected, or 2 message are lost, originator could still receive 3 responses, which may avoid too much latency due to retransmission. In step 262, the group members may be selected based on methods and criteria in request or default method maintained in service layer.

With continued reference to FIG. 19, at step 263, group hosting CSE 252 sends a request to each selected member hosting CSE (e.g., member hosting CSE 253, member hosting CSE 254, and member hosting CSE 255, among others). In this exemplary case, three members are selected, which is more than the requested two members. Since AE 251 specifies random selection, group hosting CSE 252 randomly selects three group members.

Discussed below is case 271 of FIG. 19, which is an exemplary flow for collecting a requested number of successful responses before receiving all the responses. At step 264, the first two return responses are received, indicating that the request operation has been successfully performed.

includes an originator (e.g., AE or CSE) wants to initiate an anycast/somecast to one or a set of service nodes. Signature-processingAnycastSomecastMessage is similar to one or more tables before.

TABLE 7

Signature - processingAnycastSomecastMessage

| Parameter name | Direction | Optional | Description |
| --- | --- | --- | --- |
| anycastSomecastIndicator | IN | NO | Indicate requested operation is desired to be performed through anycast or somecast |
| numberOfAnycastSomecastNode | IN | NO | Indicate the required number of service nodes for anycast or somecast |
| groupBasedIndication | IN | NO | Indicate if it is group based or non-group based anycast/somecast |
| groupID | IN | YES | Provide group ID for group based case. This is used for only group based scenario. |
| retransOption | IN | YES | Indicate the retransmission approach for anycast/somecast if necessary. It could be more than one options specified |
| groupSelectionRequired | IN | YES | Indicate if group selection is required when multiple groups are involved for anycast/somecast. This is used for only group based scenario. |
| serviceNodeIDRequired | IN | YES | Indicate if the service node ID is required in the response message when the operation is successfully performed by the service node |
| serviceNodeSelectionCriteria | IN | YES | Indicate a list of criteria and method for selecting the service nodes |
| validation | OUT | YES | Indicate the parameters in the request is not valid if necessary |

At step 265, group hosting CSE 252 determines to aggregate the responses to AE 251, since it has received the requested number of successful responses. At step 266, group hosting CSE 252 sends the aggregated response message to AE 251. At 267, the responses received by group hosting CSE 252 thereafter will be ignored if for the request of step 261.

Discussed below is case 272 of FIG. 19, which is an exemplary flow for a failure to collect the requested number of successful responses. At step 281 and step 282, two selected group members do not return successful responses to group hosting CSE 252 due to the process error and message loss. At step 283, group hosting CSE 252 reselects different group members based on the responses associated with step 281 and step 282. Group hosting CSE 252 determined that it failed to collect the requested number of successful response for request operation. It collected one of the two. At step 284, group hosting CSE 284 sends a request message to a newly selected group member (e.g., member hosting CSE 255 selected in step 283). At step 285, group hosting CSE 252 receives a successful response associated with the request message of step 284. At step 286, group hosting CSE 252, aggregates the responses received. At step 287, group hosting CSE 252 sends an aggregated response to AE 251.

Figure 20:
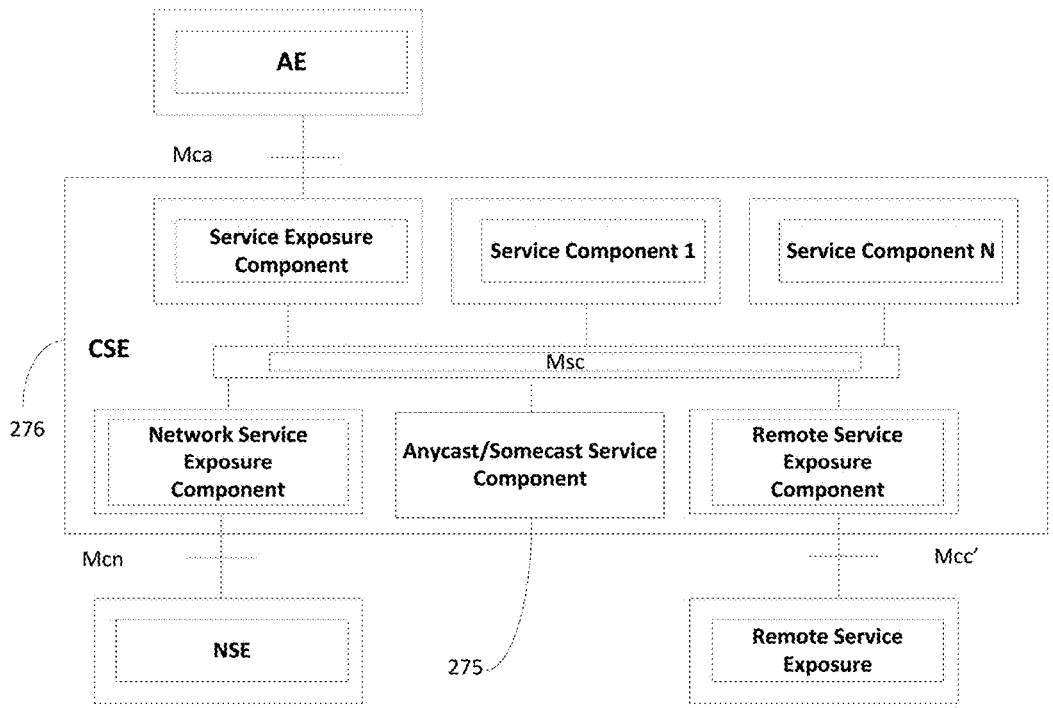
FIG. 20 illustrates an exemplary implementation architecture of SAS in the oneM2M service component architecture.
Figure 21:
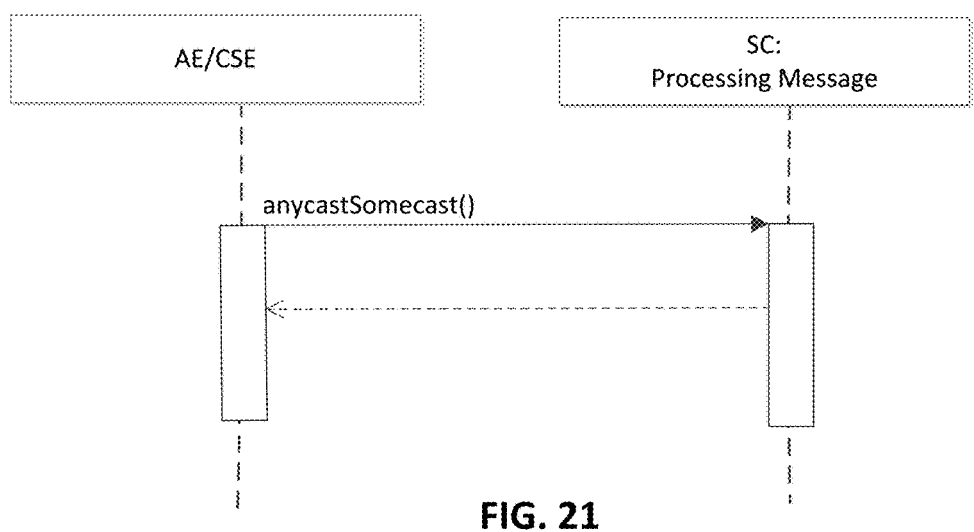
FIG. 21 illustrates exemplary service interactions for anycast/somecast.

FIG. 20 illustrates an exemplary implementation architecture of SAS in the oneM2M service component architecture (oneM2M Service Component Architecture, oneM2M-TS-0007 oneM2M Functional Architecture-V-0.7.0). As shown there is SAS component 275 in CSE 276. This service capability provides the capability to validate the parameters in request, identify the anycast/somecast scenario and determine the scope of service node for selection Below are further discussion with regard to service capability. The processingAnycastSomecastMessage service capability provides the capability to validate the parameters in request, identify the anycast/somecast scenario, and determine the scope of service node for selection. A pre-condition FIG. 21 illustrates exemplary service interactions for anycast/somecast, which has flows for SOA. The oneM2M resource interworking service capability may be used to retrieve the weight on the service layer link to a service layer neighbor. The service capability aligns with the <group> resource and maps to the CRUD procedure for the resource.

Figure 22:
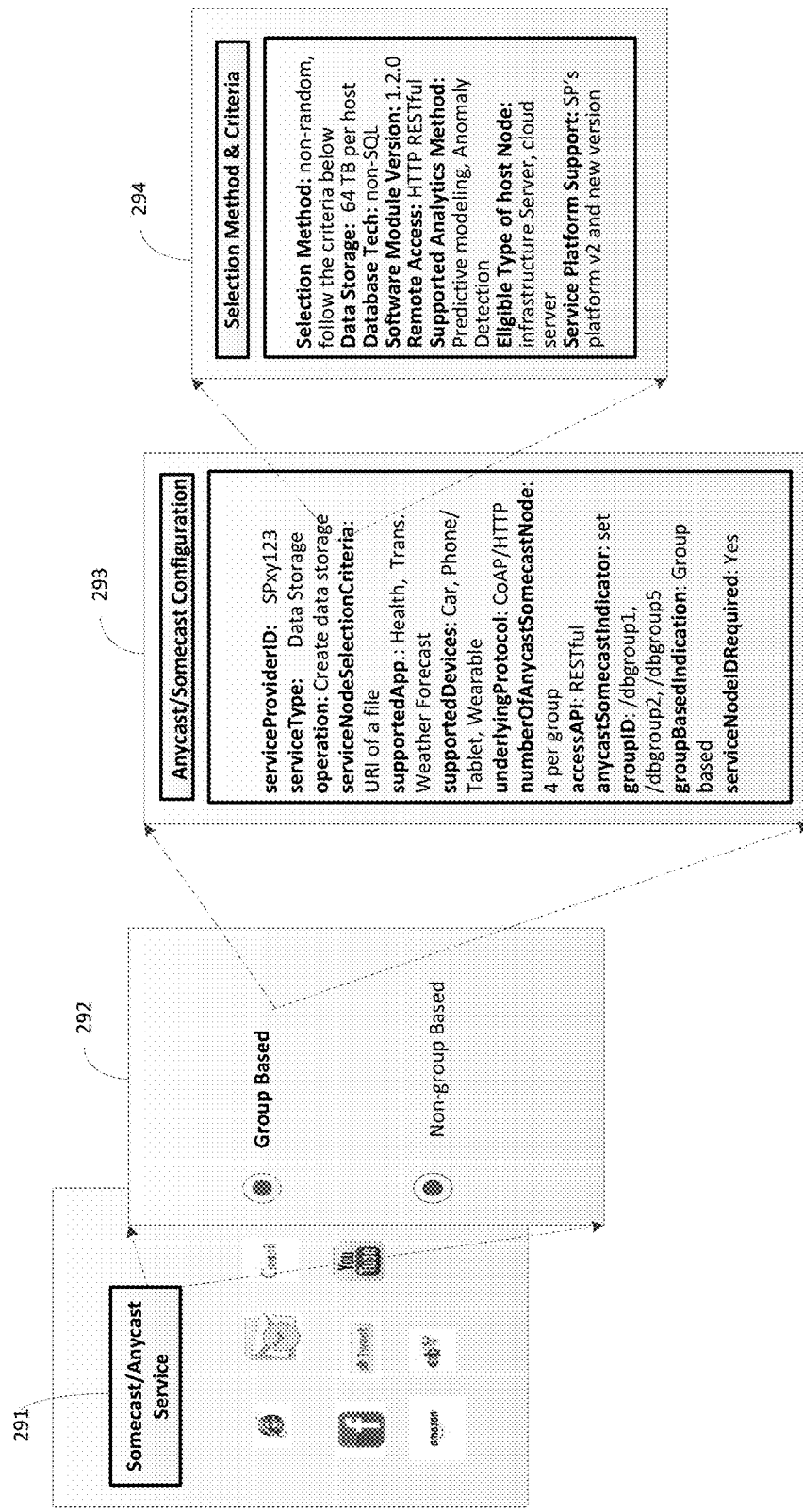
FIG. 22 illustrates an exemplary user interface for utilizing somecast/anycast service.

FIG. 22 illustrates what may be displayed on an exemplary graphical user interface associated with SAS. The display may be communicatively connected with any computing based device. Icon 291 is for SAS and when selected may display at block 292 a group based or non-group based option. If a group-based option is selected information in block 293 may be displayed with somecast/anycast parameters as discussed herein. One or more of the parameters in block 293 may be selected to bring up additional information. For example, serviceNodeSelectionCriteria may be selected and provide the information in block 294. In another example, progress of any of the steps (e.g., sent messages or success of steps) discussed herein may be displayed. The method flows of FIG. 15-FIG. 17, among others, may be displayed as discussed herein. A user interface may be implemented for configuring or programming those parameters with default values, as well as control switches for enabling or disabling certain features for the anycast/somecast service.

Without in any way unduly limiting the scope, interpretation, or application of the claims appearing herein, a technical effect of one or more of the examples disclosed herein is to provide adjustments to how devices and applications are communicated with over a service layer. SAS may provide for more efficient communication in some instances when communication is associated with a service layer.

FIG. 23A is a diagram of an example machine-to machine (M2M), Internet of Things (IoT), or Web of Things (WoT) communication system 10 in which one or more disclosed concepts may be implemented. Generally, M2M technologies provide building blocks for the IoT/WoT, and any M2M device, M2M gateway or M2M service platform may be a component of the IoT/WoT as well as an IoT/WoT service layer, etc.

As shown in FIG. 23A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 23A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 23B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 23B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using SAS, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

As discussed, the SAS of the present application may be implemented as part of a service layer. The service layer is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain the SAS of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). Further, the SAS of the present application can be implemented as part of an M2M network that uses a Service Oriented Architecture (SOA) and/or a resource-oriented architecture (ROA) to access services such as the SAS of the present application.

As discussed herein, the term "service layer" may be considered a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications or various devices with access to a collection of or a set of the above mentioned capabilities or functionalities, supported by the service layer, which can be referred to as a CSE or service capability layer (SCL). A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (e.g., functional interfaces between such functional entities) in order for them to use such capabilities or functionalities.

FIG. 23C is a system diagram of an example M2M device 30, such as an M2M terminal device 18 or an M2M gateway device 14 for example. As shown in FIG. 23C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., originator 161, originator 184, service node 165, registrar node 164, registrar node 184, group 2 hosting node 185, group 2 member node 187, and others) may be an exemplary implementation that performs the disclosed systems and methods for device SAS.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 23C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, the transmit/receive element 36 may be an antenna configured to transmit and/or receive RF signals. The transmit/receive element 36 may support various networks and air interfaces, such as WLAN, WPAN, cellular, and the like. In an example, the transmit/receive element 36 may be an emitter/detector configured to transmit and/or receive IR, UV, or visible light signals, for example. In yet another example, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 23C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether requests or response associated with SAS in some of the examples described herein are successful or unsuccessful (e.g., retransmission, group selection, etc.), or otherwise indicate a status of requests or response for SAS and associated components. FIG. 22 is an example SAS information and interactive links that may be displayed on display 42. The control lighting patterns, images, or colors on the display or indicators 42 may be reflective of the status of any of the method flows or components in the FIG.'s illustrated or discussed herein (e.g., FIG. 13-FIG. 19, etc.). Disclosed herein are messages and procedures of SAS. The messages and procedures can be extended to provide interface/API for users to SAS via an input source (e.g., speaker/microphone 38, keypad 40, or display/touchpad 42) and request, configure, or query SAS, among other things that may be displayed on display 42.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

FIG. 23D is a block diagram of an exemplary computing system 90 on which, for example, the M2M service platform 22 of FIG. 23A and FIG. 23B may be implemented. Computing system 90 (e.g., M2M terminal device 18 or M2M gateway device 14) may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for SAS, such as requesting service nodes to retrieve information or execute a service, among other things.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 23A and FIG. 23B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred methods, systems, or apparatuses of the subject matter of the present disclosure—SAS—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps to example methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for SAS. A method, system, computer readable storage medium, or apparatus has means for receiving a first request message including instructions to somecast using a service layer; determining target nodes based on selection criteria in the request message; and sending a second request message to the target nodes, which may be to perform a desired operation. The first request message may include an indication of a number of service nodes required to complete the first request, which is associated with somecast. The first request message may include an indication of group-based or non-group based somecast. The first request message may include a group identifier for a group-based somecast. The selection criteria may include a type of service node. The first request message may include an indication of a number range of an amount of service nodes that can be used to satisfy the first request. The first request message may include an indication of anycast (e.g., indicate only on service node) or a retransmission option. The first request message may include a retransmission option. All combinations in this paragraph (including the removal or addition of steps) are contemplated in a manner that is consistent with the other portions of the detail description.

Methods, systems, and apparatuses, among other things, as described herein may provide for means for SAS. A method, system, computer readable storage medium, or apparatus has means for determining a first type of information desired, the first type of information obtainable by a plurality of communicatively connected nodes, wherein the first type of information is based on sensing a physical world; determining a representative subset of the plurality of nodes, the representative subset based on a first criteria; and sending a request message for the first type of information to the representative subset of the plurality of nodes.

What is claimed:

1. An apparatus comprising: a processor; and
   a memory coupled with the processor, the memory comprising executable instructions that when executed by the processor cause the processor to effectuate operations comprising:
   receiving, from a device, a first request message comprising instructions to somecast using a service layer, the first request message comprises a selection criteria;
   determining target nodes to perform an operation, wherein the determining of the target nodes are based on the selection criteria in the first request message, wherein the selection criterion comprises an indication that the target nodes to perform the operation are within a physical location, wherein the operation comprises retrieving data from the target nodes or turning on the target nodes; and
   sending a second request message to the target nodes to perform the operation;
   wherein based on the sending of the second request message, determining that a minimum number of the target nodes has performed the operation based on the one or more received responses, the minimum number of the target nodes is less than the determined target nodes to perform the operation; and
   sending a second response message to the device, the second response message comprising the retrieved data from the minimum number of target nodes, or an indication that the minimum number of target nodes are on.

2. The apparatus of claim 1, wherein the first request message comprises an indication of group-based somecast.

3. The apparatus of claim 1, wherein the first request message comprises a group identifier for a group-based somecast.

4. The apparatus of claim 1, wherein the selection criteria comprises a type of service node.

5. The apparatus of claim 1, wherein the selection criteria comprises a type of networking protocol used with a service node.

6. The apparatus of claim 1, wherein the first request message comprises a retransmission option.

7. A computer readable storage medium comprising computer executable instructions that when executed by a computing device cause said computing device to effectuate operations comprising:
   receiving, from a device, a first request message comprising instructions to somecast within a service layer platform, the first request message comprises a selection criteria;
   determining target nodes to perform an operation, wherein the determining of the target nodes are based on the selection criteria in the first request message, wherein the selection criterion comprises an indication that the target nodes to perform the operation are within a physical location, wherein the operation comprises retrieving data from the target nodes; and
   sending a second request message to the target nodes to perform the operation;
   wherein based on the sending of the second request message, determining that a minimum number of the target nodes has performed the operation based on the one or more received responses, the minimum number of the target nodes is less than the determined target nodes to perform the operation; and
   sending a second response message to the device, the second response message comprising the retrieved data from the minimum number of target nodes, or an indication that the minimum number of target nodes are on.

8. The computer readable storage medium of claim 7, wherein the first request message comprises an indication of group based somecast.

9. The computer readable storage medium of claim 7, wherein the first request message comprises a group identifier for a group-based somecast, wherein the group identifier is a universal resource identifier of a resource.

10. The computer readable storage medium of claim 7, wherein the selection criteria comprises a type of service node.

11. The computer readable storage medium of claim 7, wherein the selection criteria comprises a type of networking protocol used with a service node.

12. The computer readable storage medium of claim 7, wherein the selection criteria comprises an indicator for a response for mixed types of service nodes.

13. A method comprising:
receiving, from a device, a first request message that indicates to somecast within a service layer platform, the first request message comprises a selection criteria;
determining target nodes to perform an operation, wherein the determining of the target nodes are based on the selection criteria in the request message, wherein the selection criterion comprises an indication that the target nodes to perform the operation are within a physical location, wherein the operation comprises retrieving data from the target nodes or turning on the target nodes: and
sending a second request message to the target nodes to perform the operation;
wherein based on the sending of the second request message, determining that a minimum number of the target nodes has performed the operation based on the one or more received responses, the minimum number of the target nodes is less than the determined target nodes to perform the operation; and
sending a second response message to the device, the second response message comprising the retrieved data from the minimum number of target nodes, or an indication that the minimum number of target nodes are on.

14. The method of claim 13, wherein the selection criterion is allowed based on a number flexibility indicator flag.

15. The method of claim 13, wherein the first request message comprises an indication of group-based somecast.

16. The method of claim 13, wherein the first request message comprises a group identifier for a group-based somecast, wherein the group identifier is a universal resource identifier of a resource.

17. The method of claim 13, wherein the target nodes are sensors.

* * * * *